(12) United States Patent
Kwon et al.

(10) Patent No.: US 12,642,393 B2
(45) Date of Patent: Jun. 2, 2026

(54) GRAIN DISPENSER AND METHOD OF CONTROLLING SAME

(71) Applicant: LG ELECTRONICS INC., Seoul (KR)

(72) Inventors: Taejung Kwon, Seoul (KR); Taegu Kang, Seoul (KR); Eunsuk Kim, Seoul (KR); Byungki Kim, Seoul (KR); Sunghoon Jung, Seoul (KR); Joomin Kim, Seoul (KR); Seonghyok Kim, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 767 days.

(21) Appl. No.: 18/059,586

(22) Filed: Nov. 29, 2022

(65) Prior Publication Data

US 2023/0190046 A1 Jun. 22, 2023

(30) Foreign Application Priority Data

Dec. 16, 2021 (KR) ........................ 10-2021-0180980

(51) Int. Cl.
*A47J 47/01* (2006.01)
*A47J 27/10* (2006.01)
(52) U.S. Cl.
CPC ............... *A47J 47/01* (2013.01); *A47J 27/10* (2013.01)
(58) Field of Classification Search
CPC .. A47J 47/01; A47J 27/10; A47J 44/00; A47J 43/0727; A47J 44/02; A47J 27/18;
(Continued)

(56) References Cited

U.S. PATENT DOCUMENTS 11,406,121 B2 * 8/2022 Wang .................... A47J 36/321
2002/0022523 A1 * 2/2002 Dan ........................ G06N 3/004
463/42
(Continued)

FOREIGN PATENT DOCUMENTS

JP 2021519193 8/2021
KR 200309747 4/2003
(Continued)

OTHER PUBLICATIONS

Korean Intellectual Property Office Application Serial No. 10-2021-0180980, Office Action dated Jan. 4, 2023, 8 pages.

*Primary Examiner* — Eric S Stapleton
(74) *Attorney, Agent, or Firm* — LEE, HONG, DEGERMAN, KANG & WAIMEY

(57) ABSTRACT

Proposed is a grain dispenser including: a storage unit including a plurality of storage hoppers in which different kinds of grain, respectively, are stored; a container accommodating the kinds of grain to be dispensed; a water supply unit and a water draining unit that supply and drain water, respectively; a container actuator rotating the container to mix and wash the kinds of grain; an artificial intelligence unit identifying a user who makes a request for meal cooking, and learning a kind of grain to be dispensed, an amount of grain to be dispensed, and a multigrain mixture ratio; a memory in which customized data including at least one of the kind of grain to be dispensed, the amount of grain to be dispensed, and the multigrain mixture ratio are stored; and a controller controlling the storage unit, the container actuator, the water supply unit, and the water draining unit.

16 Claims, 14 Drawing Sheets

(58) Field of Classification Search
CPC ............ A47J 2027/006; A47J 2027/008; A47J
27/0817; A47J 27/004; A47J 43/046;
A47J 27/62; A47J 37/1228; A47J 36/32;
A47J 36/321; A47J 27/0802; A47J
27/21083; A23L 5/20; A23L 5/13; A23V
2002/00; G06F 18/217; G06F 18/2415;
G06N 3/045; G06N 3/08; G06N 3/084;
G06T 7/0002; G06T 2207/30; G06V
10/776; G06V 20/00; G06V 20/68; H04N
23/60; H04N 23/61
USPC ............... 99/324–643; 222/14–73, 129–192,
222/630–637, 638–652, 251–575;
463/1–47; 706/1–62, 900–934
See application file for complete search history.

(56) References Cited

U.S. PATENT DOCUMENTS

| | | | | |
|---|---|---|---|---|
| 2019/0274337 A1* | 9/2019 | Wang | ..................... | G06V 20/00 |
| 2019/0313833 A1* | 10/2019 | Li | .......................... | G06N 3/084 |

FOREIGN PATENT DOCUMENTS

| | | |
|---|---|---|
| KR | 20160145486 | 12/2016 |
| KR | 20160146270 | 12/2016 |
| KR | 102001892 | 7/2019 |
| KR | 20210030796 | 3/2021 |

* cited by examiner

FIG. 5
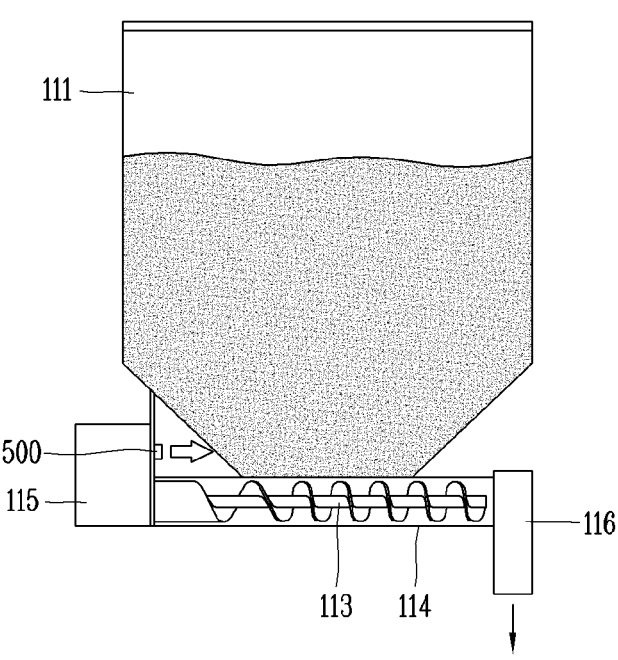
(a)
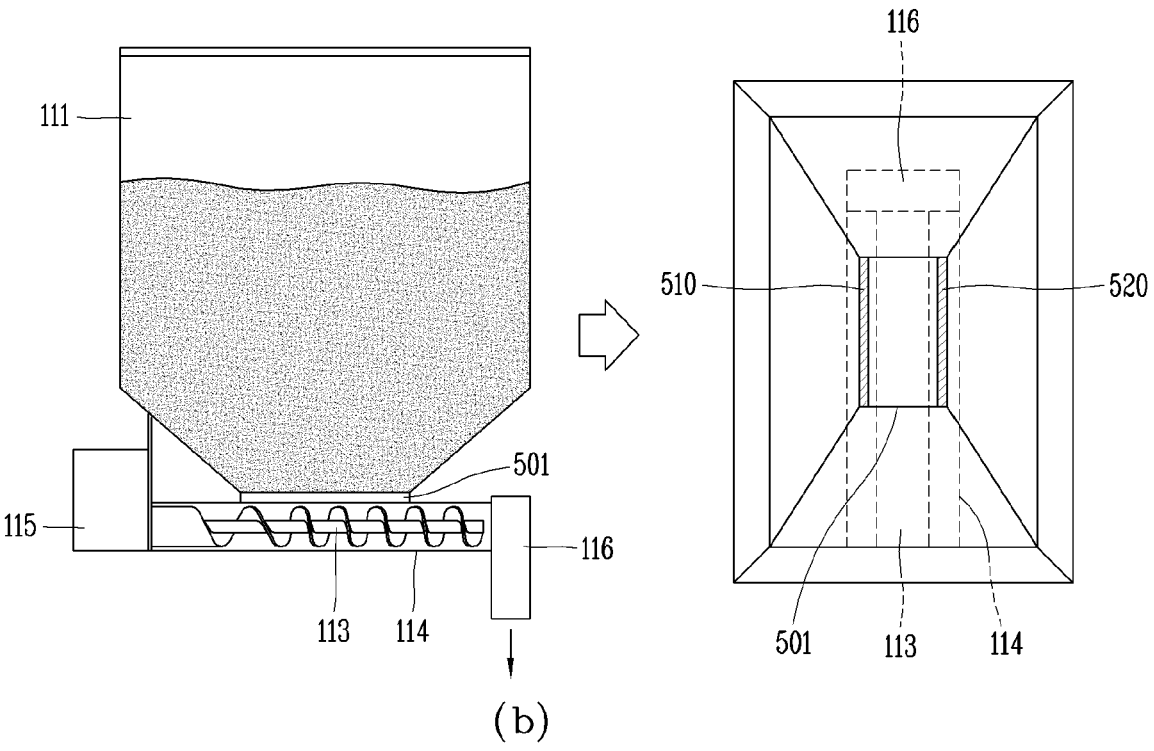
(b)

FIG. 6

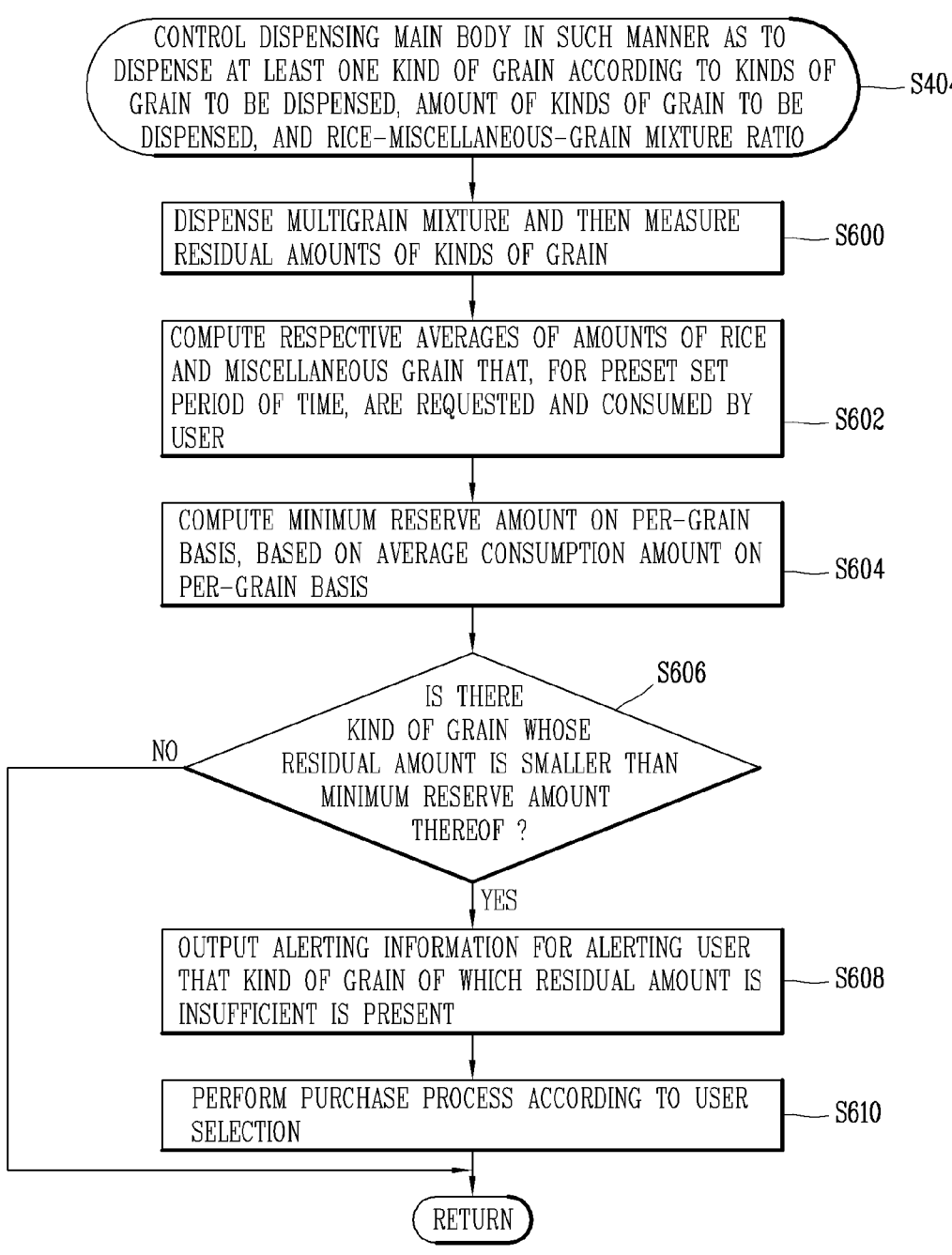

CONTROL DISPENSING MAIN BODY IN SUCH MANNER AS TO DISPENSE AT LEAST ONE KIND OF GRAIN ACCORDING TO KINDS OF GRAIN TO BE DISPENSED, AMOUNT OF KINDS OF GRAIN TO BE DISPENSED, AND RICE-MISCELLANEOUS-GRAIN MIXTURE RATIO — S404

DISPENSE MULTIGRAIN MIXTURE AND THEN MEASURE RESIDUAL AMOUNTS OF KINDS OF GRAIN — S600

COMPUTE RESPECTIVE AVERAGES OF AMOUNTS OF RICE AND MISCELLANEOUS GRAIN THAT, FOR PRESET SET PERIOD OF TIME, ARE REQUESTED AND CONSUMED BY USER — S602

COMPUTE MINIMUM RESERVE AMOUNT ON PER-GRAIN BASIS, BASED ON AVERAGE CONSUMPTION AMOUNT ON PER-GRAIN BASIS — S604

IS THERE KIND OF GRAIN WHOSE RESIDUAL AMOUNT IS SMALLER THAN MINIMUM RESERVE AMOUNT THEREOF ? — S606

NO

YES

OUTPUT ALERTING INFORMATION FOR ALERTING USER THAT KIND OF GRAIN OF WHICH RESIDUAL AMOUNT IS INSUFFICIENT IS PRESENT — S608

PERFORM PURCHASE PROCESS ACCORDING TO USER SELECTION — S610

RETURN

GRAIN DISPENSER AND METHOD OF CONTROLLING SAME

CROSS-REFERENCE TO RELATED APPLICATION

Pursuant to 35 U.S.C. § 119(a), this application claims the benefit of the earlier filing date and the right of priority to Korean Patent Application No. 10-2021-0180980, filed on Dec. 16, 2021, the contents of which are hereby incorporated by reference herein in its entirety.

TECHNICAL FIELD

This disclosure relates to a grain dispenser for storing kinds of grain, including rice and miscellaneous grain, and dispensing the kinds of grain.

BACKGROUND

With recent technology development, there has been an ever-growing demand for automated apparatuses that provide living convenience. In countries, including Republic of Korea, in which staple food is rice, it is inconvenient to cool a meal using rice. Therefore, it is necessary to address the social needs of automatically cooking the meal using rice.

Cooking appliances, such as an electric rice cooker and a pressure rice cooker, which help a user to cook the meal in a relatively simple manner using rice, have appeared on the market in order to satisfy these social needs. However, these cooking appliances, such as the electric rice cooker and the pressure rice cooker, are relatively simple cooking appliances that apply suitable heat and pressure, respectively, to containers placed thereinto by pressing down cooking buttons provided thereon. Before cooking, the user puts a suitable amount of rice into one of the containers. In this manner, the user himself/herself has to put the suitable amount of rice into the container inside the cooking appliance. Accordingly, it is difficult to prepare the suitable amount of rice that corresponds to a desired amount of the meal.

Furthermore, because cleaned rice goes several times through a rice-polishing process, fine bran is attached to a surface of the cleaned rice. This fine bran has to be removed from a surface of the cleaned rice in order to cook the meal using this cleaned rice. It is necessary to wash the cleaned rice. Moreover, because moisture content of the cleaned rice is decreased during the rice-polishing process and a rice-drying process, it is required to macerate the cleaned rice, in a state of being soaked in water, for a predetermined time in order to compensate for a decreased amount of moisture. In this case, when the number of times of washing is too small, the cleaned rice smells of unremoved bran. In a case where an amount of water for meal cooking is too small, or where the meal is cooked in a state where the cleaned rice is not sufficiently macerated, the cooked meal may have the food texture that feels hard and dry due to an insufficient amount of moisture. In contrast, in a case where the amount of water for meal cooking is too large or where the cleaned rice is too macerated, the cooked meal may have the food texture that feels soft and runny. Accordingly, it is difficult to cook the meal that has not only a suitable amount of moisture, but also the food texture satisfying the user's appetite.

There are the increasing social needs of automated cooking appliances that are capable of automatically adjusting an amount of rice and of setting a washing time, an amount of water for meal cooking, and a maceration time. With these automated cooking appliances, the user can not only cook a desired amount of the meal, but can also cook the meal having the food texture suitable to his/her appetite.

Furthermore, the meal that is cooked using a multigrain mixture resulting from mixing rice with miscellaneous grain, rather than using the clean rice, is healthful. Thus, there is a recent trend toward the increasing social needs of multigrain meals cooked using the multigrain mixture.

However, the multigrain meal results from mixing one or more kinds of miscellaneous grain with the clean rice. A different macerating time is required to cook a delicious multigrain meal than when a meal is cooked using the clean rice. As described above, the macerating time is necessary to compensate for a decreased amount of moisture of grain itself. The macerating time may be determined in a manner that varies according to an amount of moisture of grain that is used to cool the meal, that is, according to moisture content. Thus, it is very difficult to cook the multigrain meal according to a suitable amount of water for meal cooking and a suitable macerating time therefor.

Accordingly, there is the increasing social needs of automated cooking appliances that are capable of automatically mixing user-desired amount of kinds of grain at a user-desired mixture rate and of providing a suitable amount of water for meal cooking and a suitably-macerated multigrain mixture according to the user-desired food texture.

SUMMARY

An object of the present disclosure, which is made to solve the above-mentioned problems, is to provide a grain dispenser capable of automatically dispensing as much grain as an amount of a meal that is requested by a user, automatically washing the dispensed grain, and providing the user with a suitable amount of water for meal cooking that is consistent with the dispensed meal and with the grain macerated for a suitable time, and a method of controlling the grain dispenser.

Another object of the present disclosure is to provide a grain dispenser capable of dispensing rice and at least one kind of grain other than the rice in such a manner that these kinds of grain are automatically mixed at a user-desired mixture rate into a user-desired amount of a multigrain mixture, suitably macerating the dispensed multigrain mixture according to the user-desired food texture, and providing the macerated multigrain mixture, together with a suitable amount of water for meal cooking, and a method of controlling the grain dispenser.

According to an aspect of the present disclosure, there is provided a grain dispenser including: a storage unit comprising a plurality of storage hoppers in which different kinds of grain, respectively, are stored; a container formed in such a manner as to accommodate the kinds of grain to be dispensed from the storage unit; a water supply unit and a water draining unit that are formed in such a manner as to supply and drain water, respectively, to and from the container; a container actuator formed in such a manner as to rotate the container by a predetermined angle in order to mix and wash the kinds of grain that are accommodated; an artificial intelligence unit identifying a user who makes a request for meal cooking, in a case where the request for meal cooking is received from the user, and learning a kind of grain to be dispensed, an amount of grain to be dispensed, and a multigrain mixture ratio that are preferred by the user, according to a grain dispense record of the identified user; a memory in which customized data of the user including at least one of the kind of grain to be dispensed, the amount of grain to be dispensed, and the multigrain mixture ratio that are preferred by the identified user are stored according to a result of the learning by the artificial intelligence unit; and a controller controlling the storage unit in such a manner that the kinds of grain that are stored in the storage unit are dispensed, controlling the container actuator in such a manner as to stir the kinds of grain that are accommodated in the container and to wash a multigrain mixture resulting from the stirring, and controlling the water supply unit and the water draining unit in such a manner that the multigrain mixture is macerated in a preset amount of water for meal cooking for a preset time, on the basis of the customized data of the user that correspond to the received request.

In the grain dispenser, in a case where, as a result of analyzing the request from the user, the request from the user does not include at least one of the kind of grain to be dispensed, the amount of grain to be dispensed, and the multigrain mixture ratio, the artificial intelligence unit may determine at least one of the kind of grain to be dispensed, the amount of grain to be dispensed, and the multigrain mixture ratio that is not included in the request from the user, on the basis of the customized data of the user.

In the grain dispenser, the customized data may include at least one of the kind of grain to be dispensed, the amount of grain to be dispensed, and the multigrain mixture ratio that are preferred by the identified user, and when the request is received from the user, the artificial intelligence unit may detect a point in time at which the request is received and may learn at least one of the kind of grain that is dispensed according to the request from the user, the amount of grain that is dispensed according to the request from the user, and the multigrain mixture ratio that are determined according to the request from the user, as at least one of the kind of grain to be dispensed, the amount of grain to be dispensed, and the multigrain mixture ratio that are preferred by the user at the detected point in time.

In the grain dispenser, the storage unit may include at least one moisture content ratio sensor for measuring moisture content ratios of the kinds of grain that are stored in the plurality of storage hoppers, respectively, and the controller may determine the amount of water for meal cooking and the macerating time on the basis of the moisture content ratios of the kinds of grain in the plurality of storage hoppers, respectively, that are measured according to a result of the measurement by the moisture content ratio sensor and the multigrain mixture ratio for the multigrain mixture.

In the grain dispenser, the moisture content ratio sensor may be a camera-type sensor that measures infrared ray absorption ratios of the kinds of grain that are stored in the plurality of storage hoppers, respectively, or may be an electrode-type sensor that measures impedance characteristics of the kinds of grain that are stored in the plurality of storage hoppers, respectively.

In the grain dispenser, the controller may detect any one mixed kind of grain of which an amount is equal to or higher than a preset amount, among mixed kinds of grain in the multigrain mixture, and may determine a moisture content ratio of the entire multigrain mixture on the basis of the measured moisture content ratios of the kinds of grain.

In the grain dispenser, in a case where the user makes a request for a change of the amount of water for meal cooking or the macerating time that is determined, the controller may change the amount of water for meal cooking or the macerating time according to the request by the user for the change, and the artificial intelligence unit may learn the customized data further including information on the amount of water for meal cooking or the macerating time that is preferred by the user, on the basis of the information on the amount of water for meal cooking or the macerating time that is changed according to the request by the user for the change, and, in response to a request by the controller, may provide to the controller the customized data further including the information on the amount of water for meal cooking or the macerating time.

The grain dispenser may further include a communication unit performing wireless communication with a preset external apparatus or a preset server, wherein the artificial intelligence unit may analyze a food preference of the user and a health state of the user on the basis of the customized data of the user and information, associated with health of the user, that is collected from the preset external apparatus or the preset server for a preset period of time, may search for at least one food recipe on the basis of the analyzed food preference and health state of the user, and may provide to the controller at least one food recipe that is found.

The grain dispenser may further include an output unit formed in such a manner that at least one of an audio signal and a video signal is possibly output, wherein the controller may control the output unit in such a manner as to output at least one food recipe that is provided from the artificial intelligence unit, may extract a meal recipe associated with a meal, from the selected food recipe, in response to selection of any one food recipe by the user, and may control the storage unit in such a manner as to discharge the kinds of grain according to at least one of the kind of grain to be dispensed, the amount of grain to be dispensed, and the multigrain mixture ratio that are stated in the extracted meal recipe.

In the grain dispenser, the controller may determine at least one of an amount of water for meal cooking and a macerating time that are for the kinds of grain that are discharged, on the basis of the meal recipe, and may control the water supply unit and the water draining unit in such a manner that the multigrain mixture is macerated according to at least one of the amount of water for meal cooking and the macerating time that are determined.

In the grain dispenser, the controller may collect information on a food material that is stored in the external apparatus, through a communication connection to the preset external apparatus in which the food material is stored, and may search for that at least one food recipe on the basis of the collected information on the food material.

In the grain dispenser, the artificial intelligence unit may be a separate artificial intelligence device formed in such a manner as to possibly communicate with the grain dispenser.

In the grain dispenser, the container may include: a water inlet portion through which the water is supplied to the container from the water supply unit; a water outlet portion connected to the water draining unit and formed in such a manner that the supplied water is drained through the water outlet portion; a container cover formed in such a manner as to rotate the container when a shaft, formed on the center of the container cover, that is connected to the container actuator is rotated by the container actuator; and a discharging outlet port formed in a lower end portion of the container in such a manner as to be open and closed under the control of the controller, so that the amount of water for meal cooking and the multigrain mixture that are accommodated in the container are discharged when the dispensing outlet port is open.

In the grain dispenser, the storage unit may further include at least one camera for acquiring images of the kinds of grain that are stored in the plurality of storage hoppers, respectively, and the controller may identify the kinds of grain that are stored in the plurality of storage hoppers, respectively, on the basis of the images of the kinds of grain that are acquired by the at least one camera.

In the grain dispenser, the storage unit may include at least one residual-amount sensor for measuring residual amounts of the kinds of grains that are stored in the plurality of storage hoppers, respectively, and the controller may detect a kind of grain whose residual amount measured through the residual-amount sensor is smaller than a preset minimum reserve amount, among the kinds of grain that are stored in the plurality of storage hoppers, respectively, and may provide alerting information for alerting the user that the detected residual amount of the kind of grain is insufficient.

In the grain dispenser, the controller may perform a process of purchasing the kind of grain whose residual amount is smaller than a minimum reserve amount, on the basis of a response by the user to the provided alerting information.

The grain dispenser according to the present disclosure is described as follows.

According to at least one embodiment of the present disclosure, a suitable amount of grain is dispensed on the basis of learned data, according to a user request or an amount of grain that is consumed by the user. Kinds of grain that are dispensed are automatically washed. Then, the kinds of grain that are dispensed are macerated for a time that is consistent with an amount of the kinds of grain dispensed. Then, the kinds of grain that are macerated are provided together with a suitable amount of water for meal cooking. Accordingly, a user can cook the kinds of grain that are provided. Thus, the effect of cooking a user-desired amount of a meal in such a manner as to have the user-desired food texture can be achieved.

In addition, according to the present disclosure, a multi-grain mixture resulting from mixing two or more kinds of grain is dispensed according to a preset mixture rate. Then, the dispensed multigrain mixture is automatically washed, and the multigrain mixture is macerated, in a suitable amount of water for meal cooking, for a suitable time. Accordingly, the user can cook the kinds of grain that are provided. Thus, the effect of cooking a user-desired amount of a meal in such a manner as to have the user-desired food texture can be achieved.

In addition, according to the present disclosure, a multi-grain mixture ratio and an amount of grain to be dispensed are automatically adjusted on the basis of learning data that are personalized using artificial intelligence. Thus, the effect of providing individual diet management can be achieved.

In addition, according to the present disclosure, a moisture content ratio of grain contained is measured, and a macerating time is caused to vary suitably according to the detected moisture content ratio. Thus, the effect of consistently cooking a meal having the user-desired food texture even in a case where the moisture content ratio of the stored grain varies with time can be achieved.

BRIEF DESCRIPTION OF THE DRAWINGS

FIGS. 5A and 5B are views illustrating each illustrating an example of a measurement unit that measures a moisture content ratio of grain stored in a storage unit in the grain dispenser according to the embodiment of the present disclosure.

FIG. 6 is a flowchart illustrating a process in which the grain dispenser according to the embodiment of the present disclosure operates to purchase a kind of grain according to a residual amount thereof.

DETAILED DESCRIPTION

It is noted that the technical terms used herein are used only to describe specific embodiments and are not intended to limit the disclosure. A singular representation used herein may include a plural representation unless it represents a definitely different meaning from the context. In general, a suffix such as "module" and "unit" may be used to refer to elements or components. Use of such a suffix herein is merely intended to facilitate description of the specification, and the suffix itself is not intended to give any special meaning or function.

In this application, the terms "comprising" and "including" should not be construed to necessarily include all of the elements or steps disclosed herein, and should be construed not to include some of the elements or steps thereof, or should be construed to further include additional elements or steps.

In describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings. It should also be understood that each of embodiments described below and combinations of those embodiments are all changes, equivalents, or substitutes which can belong to the idea and scope of the present disclosure.

Figure 1:
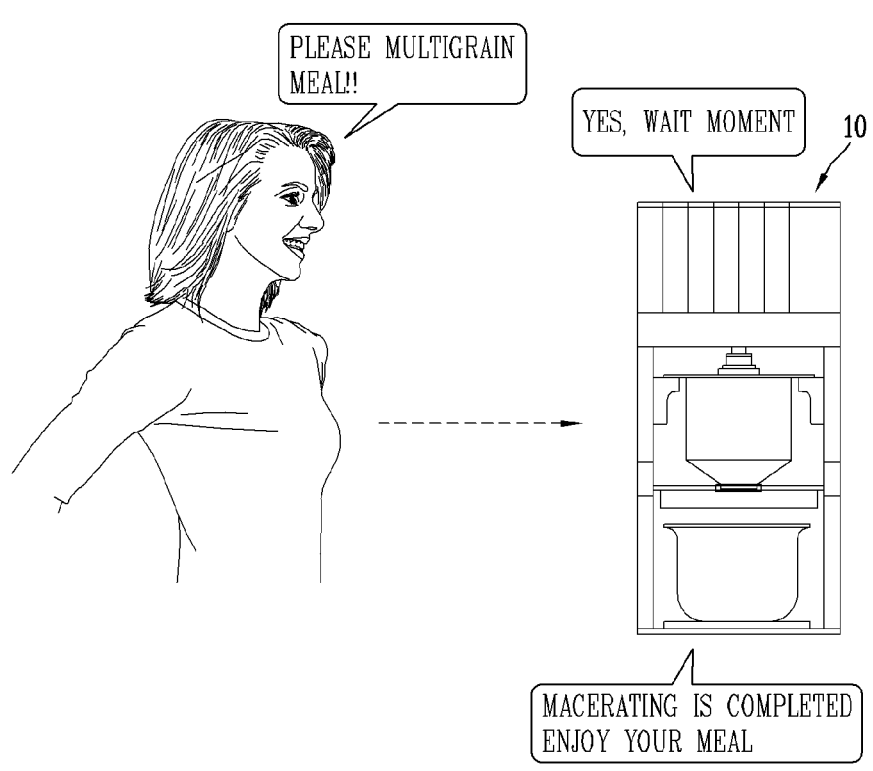
FIG. 1 is a view illustrating an example where a grain dispenser, which is automated, according to an embodiment of the present disclosure is driven.

FIG. 1 is a view illustrating an example where a grain dispenser 10, which is automated, according to an embodiment of the present disclosure is driven.

First, the grain dispenser 10 according to the embodiment of the present disclosure may include an artificial intelligence platform, and the artificial intelligence platform may include a natural language processing (NLP) component for processing a natural language. The artificial intelligence platform may understand and analyze voice information collected from a speaker through the NLP component and, according to a result of the analysis, may determine information that is requested in voice by the speaker, in the basis of pre-stored information.

Therefore, as illustrated in FIG. 1, in a case where a user utters a natural-language voice command "Please, a multigrain meal," the grain dispenser 10 according to the embodiment of the present disclosure may recognize the term "multigrain meal" in the voice command from the user and may dispense a multigrain mixture that results from mixing rice and at least one kind of grain other than the rice.

In this case, the grain dispenser 10 may dispense at least one preset kind of grain other than the rice from a storage unit in which a plurality of kinds of grains are stored, along with the rice, according to a preset ratio of kinds of grain. At this point, at least one kind of grain that is dispensed among the plurality of kinds of grains and the ratio of kinds of grain may be predesignated by the "user" who utters the voice command or may be determined by the artificial intelligence platform on the basis of learning data in consistence with a kind of grain and a ratio of kinds of grain that are preferred by the user who utters the voice command.

As an example, in a case where a plurality of users use the grain dispenser 10 according to the embodiment of the present disclosure, the grain dispenser 10 may identify each of the users in a distinguished manner. To this end, the grain dispenser 10 may include a camera (a speaker identification camera) that identifies the voice command, and may identify a speaker who utters the voice command through the speaker identification camera. In addition, the grain dispenser 10 may analyze features of voiced received and may identify a speaker on the basis of the analyzed voice features (for example, a tone, an accent, a pronunciation, and the like).

Then, the grain dispenser 10 may store a rice-miscellaneous-grain mixture ratio, a kind of miscellaneous grain to be mixed with rice, and the like, which are requested from the identified speaker (for example, by using the voice command) as learning data. In a case where a sufficient amount of the learning data is stored, the kind of miscellaneous grain and the rice-miscellaneous-grain mixture ratio that are preferred by the speaker identified on the basis of learning data stored may be stored as personalized data that corresponds to the identified speaker.

Therefore, as illustrated in FIG. 1, only by the user's inputting the natural-language voice command "Please, a multigrain meal," the grain dispenser 10 according to the present embodiment of the present disclosure may dispense a multigrain mixture that results from mixing kinds of grain preferred by the speaker who utters the voice command, at a multigrain mixture ratio preferred by the speaker who utters the voice command, from the storage unit.

The "personalized data" learned in the grain dispenser 10 according to the embodiment of the present disclosure may include all of a series of data associated with meal cooking, as well as with a kind of miscellaneous grain and a rice-miscellaneous-grain mixture ratio that are preferred by the identified speaker. For example, the "personalized data" may include an amount of the meal that is preferred by the user. In addition, the "personalized data" may include the food texture of the meal that is preferred by the user.

As an example, in a case where the user is a housewife, the user may make a request to dispense an amount of grain necessary for meal cooking for two or more persons according to the number of family members. In this case, according to a user request, on the basis of the learning data learned, the grain dispenser 10 may determine that an amount of grain that is preferred by the user has to correspond to the meal for two or more persons. Accordingly, as illustrated in FIG. 1, although a separate request is not made for an amount of grain to be dispensed, the grain dispenser 10 may dispense a multigrain mixture necessary for meal cooking for two or more persons according to the number of the user's family members.

In a case where a request to dispense the amount of grain is made, the grain dispenser 10 according to the embodiment of the present disclosure may perform learning according to when the grain dispenser 10 is requested to dispense the amount of grain. In this case, although the speakers are the same, kinds of grain to be dispensed, a rice-miscellaneous-grain mixture ratio, and an amount of grain to be dispensed may vary according to when the grain dispenser 10 is requested to dispense the amount of grain.

For example, in a case where the user is a housewife, if the user, as described above, makes a request to dispense an amount of grain when all family members gather in the evening, the grain dispenser 10, as described above, may determine that the amount of grain that is preferred by the user has to correspond to the meal for two or more persons, on the basis of the learning data learned in the "evening." However, in a case where the user makes a request to dispense an amount of grain when at least one family member goes out (for example, in the late afternoon or the like), the amount of grain that is requested may be small because a necessary amount of the meal (for example, for one person) is small. Therefore, the amount of the grain that is preferred by the user in the afternoon may be small. Accordingly, the grain dispenser 10 may learn that the user prefers a smaller amount of a grain in the afternoon.

As described above, the "personalized data" may include information for the food texture of the meal that is preferred by the user.

The grain dispenser 10 according to the embodiment of the present disclosure may not only simply dispense an amount of grain, but may also wash the dispensed multigrain mixture, macerate the washed multigrain mixture for a preset time, and provide the macerated multigrain mixture to the user in such a manner that the user can cool the meal immediately through a cooling function of an electric rice cooker, a pressure rice cooker, or the like. To this end, the grain dispenser 10 may include a container (hereinafter referred to as a "stirring-washing container) for stirring rice and miscellaneous grain, washing the stirred rice and miscellaneous grain, and macerating the washed rice and miscellaneous grain. The grain dispenser 10 may macerate the washed multigrain mixture in a preset amount of water for meal cooking in the stirring-washing container) and may provide the macerated mixture of the grains to the user. The amount of water for meal cooking and the macerating time may be factors that determine the food texture of the meal.

For example, in a case where the amount of water for meal cooking is small or where the macerating time is short, the cooked meal may have the food texture that feels hard and dry. In contrast, in a case where the amount of water for meal cooking is larger or where the macerating time is long, the cooked meal may have the food texture that feels soft and runny.

Normally, in the grain dispenser 10 according to the embodiment of the present disclosure, the amount of water for meal cooking and the macerating time may be automatically set according to an amount of the multigrain mixture and a state thereof. For example, a controller 100 of the grain dispenser 10 may set the amount of water for meal cooking to 1.1 times to 1.5 times the amount of the multigrain mixture and may automatically set the macerating time according to the amount of water for meal cooking and the amount of the multigrain mixture.

In this case, the controller 100 may set the amount of water for meal cooking in a manner that varies with the state of the multigrain mixture. For example, in a case where the multigrain mixture includes a new crop of grain (for example, a new crop of rice), the amount of water for meal cooking may be set to 1.1 times the amount of the multigrain mixture. However, in a case where the multigrain mixture includes long-stored grain (for example, long-stored rice), the amount of water for meal cooking may be set to 1.5 times the amount of the multigrain mixture. In this case, whether the multigrain mixture contains a new crop of grain or long-stored grain may be determined according to the result of selection of the user himself/herself or according to the result of sensing states of kinds of grain stored in a storage hopper.

In this manner, according to the amount of the multigrain and the state thereof, the amount of water for meal cooking and the macerating time may be automatically set. However, of course, the user can also additionally control the amount of water for meal cooking or the macerating time that is automatically set. In this case, the amount of water for meal cooking and the macerating time that are changed under the control of the user may be learned as the personalized data of the user for the food texture of the meal that is preferred by the user.

For example, in the case of the user who prefers the food texture of the meal that feels hard and dry, the amount of water for meal cooking or the macerating time may be set by decreasing at a predetermined rate the amount of water for meal cooking or the macerating time that is automatically set. In contrast, in the case where the user who prefers the food texture of the meal that feels smooth and runny, the amount of water for meal cooking or the macerating time may be set by increasing at a predetermined rate the amount of water for meal cooking or the macerating time that is automatically set. In a case where the amount of water for meal cooking or the macerating time is arbitrarily changed by the user in this manner, information associated with the changed amount of water for meal cooking or the changed macerating time may be learned as the personalized learning data on a per-user basis.

According to the user request, the grain dispenser 10 may determine a kind of miscellaneous grain to be mixed with rice and a rice-miscellaneous-grain mixture ratio on the basis of the user request or the learning data of the user and may dispense rice and at least one kind of miscellaneous grain according to the determined rice-miscellaneous-grain mixture ratio. The dispensed rice and miscellaneous grain are macerated in an amount of water for meal cooking that varies according to the learning data of the user or automatic setting, for the macerating time that varies according to the learning data of the user or the automatic setting. Then, as illustrated in FIG. 1, alerting information for alerting the user that the macerating of the rice and miscellaneous grain is completed may be output to the user.

Then, according to user input, the completely macerated multigrain mixture may be dispensed into a container arranged, together with the water for meal cooking. The arranged container here may be a container that is used in the electric rice cooker or the pressure rice cooker. That is, the user can arrange the container of the electric rice cooker or the pressure rice cooker in such a manner as to be positioned in the grain dispenser 10 according to the embodiment of the present disclosure. In this case, the completely macerated multigrain mixture is dispensed into the container, together with the water for meal cooking. Then, the user can place the container into the electric rice cooker or the pressure rice cooker and can cook the meal.

The grain dispenser 10 according to the embodiment of the present disclosure may further have a cooking function. In this case, the grain dispenser 10 may include a heating unit that is capable of heating the container accommodating the completely macerated multigrain mixture and the water for meal cooking. Of course, the grain dispenser 10 may also cool the meal immediately without a separate cooker, such as the electric rice cooker or the pressure rice cooker.

Figure 2:
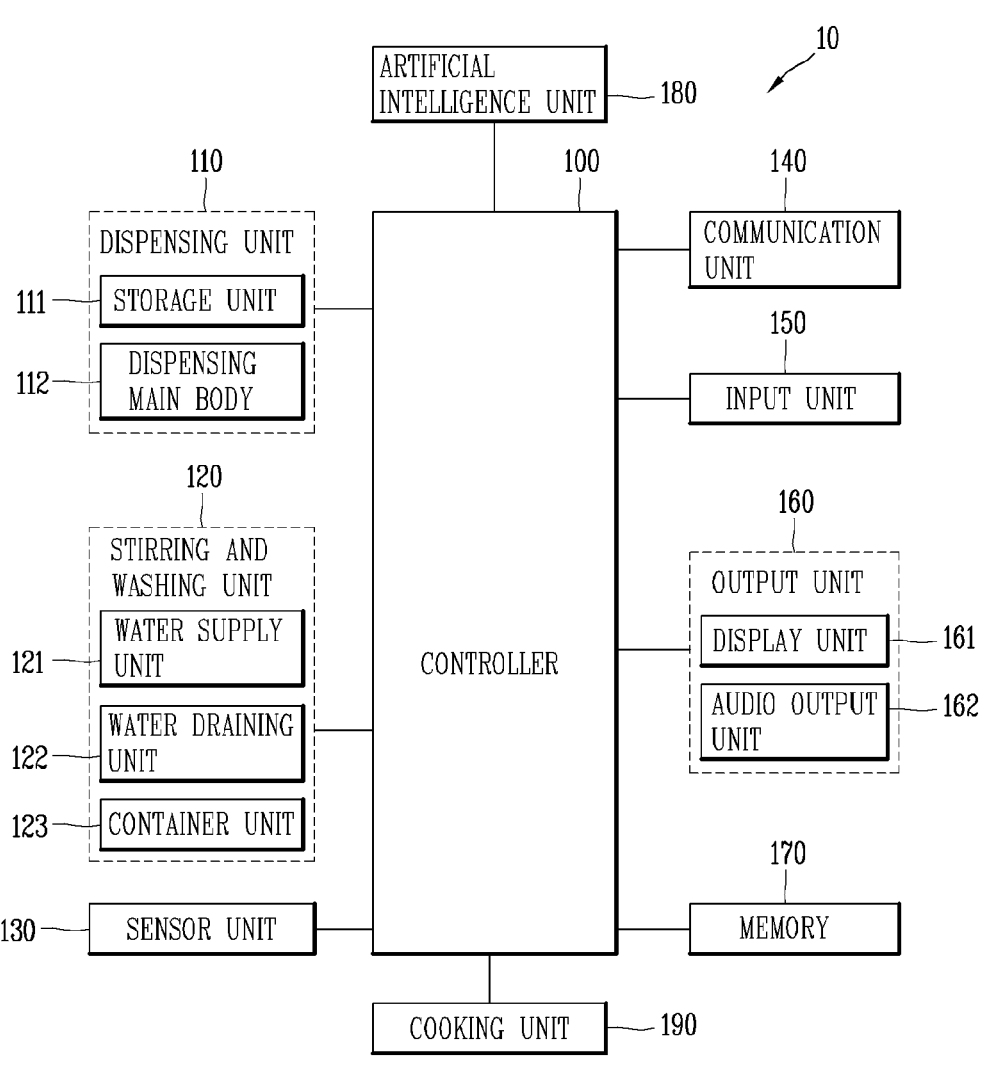
FIG. 2 is a block diagram illustrating a structure of the grain dispenser according to the embodiment of the present disclosure.
Figure 3:
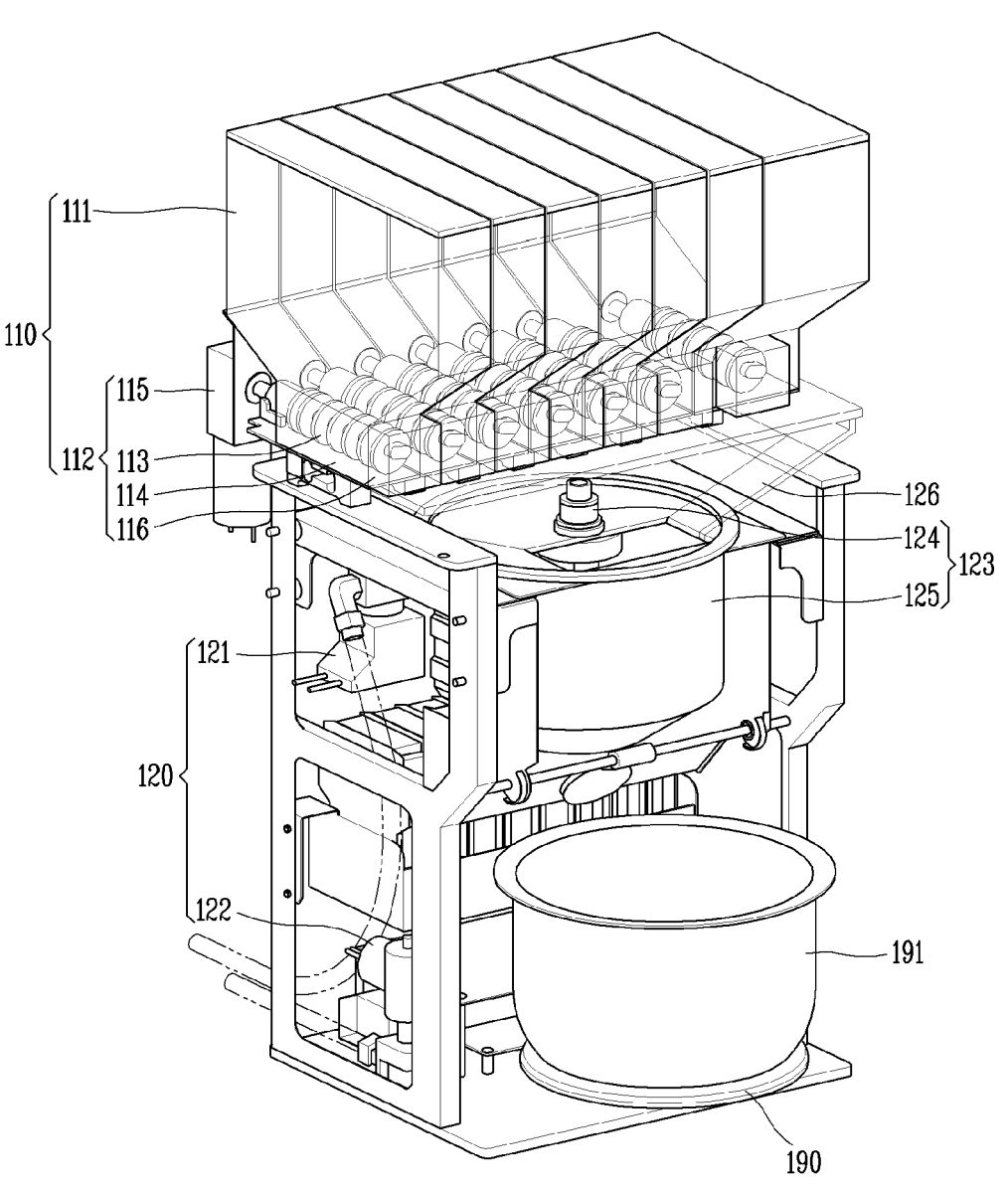
FIG. 3 is a three-dimensional view illustrating the inside of the grain dispenser according to the embodiment of the present disclosure.

FIG. 2 is a block diagram illustrating a structure of the grain dispenser 10 according to the embodiment of the present disclosure that is illustrated in FIG. 1. FIG. 3 is a three-dimensional view illustrating the inside of the grain dispenser 10 according to the embodiment of the present disclosure.

With reference to FIG. 2, the grain dispenser 10 according to the embodiment of the present disclosure may include the controller 100 and a dispensing unit 110, a stirring and washing unit 120, a sensor unit 130, a communication unit 140, an input unit 150, an output unit 160, a memory 170, and an artificial intelligence unit 180 that are connected to the controller 100 and are controlled by the controller 100. In addition, the grain dispenser 10 may be configured to further include a cooking unit 190. All constituent elements illustrated in FIG. 2 are not essential in realizing the grain dispenser 10. The grain dispenser 10 described in the present specification may have a constituent element in addition to the constituent elements listed above and may not have all the constituent elements listed above.

More specifically, the dispensing unit 110 may include a storage unit 111 having a plurality of storage hoppers that are capable of different kinds of grain, respectively. The plurality of storage hoppers may be formed in such a manner as to have the same height, but different widths, and thus may have different volumes. In this case, the storage hopper that has the largest volume may be a storage hopper in which a kind of grain that has the largest amount of consumption, for example, rice, is stored. As a kind of grain is more consumed according to the user's preference, it may be stored in a storage hopper having a larger volume.

A cover may be formed on an upper end portion of the storage hopper in such a manner as to be open and closed. Thus, the cover may be open in such a manner that a kind of grain may be stored in the storage hopper. Dispensing pipes 114 may be connected to a lower end portion of each of the storage hoppers. Screw shafts 113 for discharging kinds of grain that are accommodated in the storage hopper, respectively, are inserted into the dispensing pipes 114, respectively.

The screw shaft 113 formed rotatably may be provided inside the dispensing pipe 114. Dispensing outlet ports 116 may be formed in one side of the dispensing pipe 114. Kinds of grain that are moved as the screw shafts 113 are rotated are dispensed through the dispensing outlet ports 116, respectively.

The screw shafts 113 may be rotated by actuators (hereinafter referred to as screw actuators) 115, respectively. In this case, the screw actuators 115 may rotate the screw shafts 113, respectively, under the control of the controller 100. As the screw shafts 113 are rotated, kinds of grain introduced into the dispensing pipes 114 may be moved toward the dispensing outlet ports 116, respectively. The kinds of grain that are moved may be dispensed through the dispensing outlet ports 116, respectively.

In this case, an amount of a kind of grain that is proportional to the number of revolutions of the screw shaft 113 may be moved to the dispensing outlet port 116. Therefore, an amount of the kind of grain that is proportional to the number of rotations of the screw shaft 113 may be dispensed through the dispensing outlet port 116. That is, by controlling the screw actuators 115, the controller 100 may adjust the number of rotations of each of the screw shafts 113 and thus may adjust an amount of grain that is dispensed through the dispensing outlet ports 116.

The dispensing pipes 114, the screw shafts 113 of the dispensing pipes 114, the screw actuators 115 that cause the amount of grain to be dispensed by rotating the screw shafts 113, and the dispensing outlet ports 116 are hereinafter referred to collectively as a dispensing main body 112.

A guide unit 126 may be formed under the dispensing outlet ports 116 of the dispensing pipes 114 connected to end portions of the storage hoppers, respectively. The guide unit 126 may be formed in the shape of a funnel. Thus, the guide unit 126 has a wide inlet port in such a manner as to be connected to each of the dispensing outlet ports 116 and a narrow outlet port that is connected to an inlet port in a container 125 for stirring and washing (hereinafter referred to as a stirring and washing container). Accordingly, kinds of grain that are dispensed through the dispensing outlet ports 116, respectively, may be introduced into the stirring and washing container 126 through the guide unit 126.

The stirring and washing container 125 may have a water inlet portion and a water outlet portion. The water inlet portion here is connected to a water supply unit 121. Water that is supplied through the water supply unit may flow into the stirring and washing container 125. In contrast, the water outlet portion is connected to a water draining unit 122. The water outlet portion may be formed in such a manner that the water supplied to the stirring and washing container 125 is drained therethrough. The water outlet portion may be formed in such a manner as to include a filter in order that, in a case where the multigrain mixture is accommodated in the stirring and washing container 125, in a state of being soaked together with the water, a portion of the multigrain mixture is prevented from being discharged, together with the water, while the water is drained.

In addition, the stirring and washing container 125 may be connected to an actuator (hereinafter referred to as a container actuator) 124 that rotates the stirring and washing container 125 in order to stir and wash the multigrain mixture. As an example, the stirring and washing container 125 may include a cover (hereinafter referred to as a container cover) including an inlet port connected to the guide unit 126. A shaft that is connected to the container actuator 124 may be formed on the center of the container cover. Accordingly, the container actuator 124 may be formed in such a manner that its rotation of the shaft on the center of the container cover rotates the stirring and washing container 125 connected to the container cover by a predetermined angle.

A discharging outlet port may be in a lower end portion of the stirring and washing container 125. A discharging stopper formed in such a manner as to be open and closed may be provided in the discharging outlet port. The discharging stopper may be formed in such a manner that, under the control of the controller 100, the discharging stopper may be open and closed and that, in a case where the discharging stopper is open, the multigrain mixture and the water for meal cooking that are accommodated in the stirring and washing container 125 are dispensed through the discharging outlet port.

A container unit 123 including the container actuator 124 and the stirring and washing container 125, the water supply unit 121, and the water draining unit 122 are hereinafter referred to collectively as the stirring and washing unit 120.

More specifically, in a case where at least one kind of grain is introduced into the stirring and washing container 125 through at least one dispensing outlet port 116, the controller 100 may repeatedly perform a process of rotating the multigrain mixture alternately in one direction by a predetermined angle and in a direction different from the one direction by a predetermined angle and thus may stir the multigrain mixture introduced into the stirring and washing container 125. When the stirring process is completed, the water supply unit 121 may be controlled in such a manner as to supply an amount of water that is determined according to the amount of grain that is introduced into the stirring and washing container 125. In this case, the controller 100 may control the water supply unit 121 in such a manner that an amount of water that is larger than the amount of grain that is accommodated in the stirring and washing container 125 is supplied.

When a sufficient amount of water is supplied to the stirring and washing container 125, the controller 100 may again rotate the stirring and washing container 126 in one direction and in a direction different from the one direction by a predetermined angle. In this case, the kinds of grain accommodated in the stirring and washing container 125 may be washed with the supplied amount of water. When the stirring and washing container 125 is repeatedly rotated a predetermined number of times in this manner, it is determined that primary washing is completed. Then, the water accommodated in the stirring and washing container 125 may be drained therefrom by controlling the water draining unit 122. When the draining is completed, another sufficient amount of water may be supplied by controlling the water supply unit 121, and the above-described processes, that is, the washing and draining processes may be again repeated. In this manner, the processes of supplying water, washing the multigrain mixture, and draining the water from the stirring and washing container 125 may be repeated a preset number of times.

When the processes are repeated the preset number of times, the controller 100 may control the water supply unit 121 in such a manner that as much water as a preset amount of water for meal cooking is supplied. When as much water as the preset amount of water for meal cooking is supplied, the washed multigrain mixture may be kept soaked in the amount of water for a preset macerating time. In a case where the macerating time expires, the alerting information may be output to the user, and thus may alert the user that the macerating time expired. In a case where the user inputs a discharging request (for example, by pushing down a discharging key or inputting the voice command) in response to the alerting information, the discharging stopper on the stirring and washing container 125 may be open, and thus the multigrain mixture and the water for meal cooking that are accommodated in the stirring and washing container 125 may be discharged. In this case, the lower end portion of the stirring and washing container 125 may be formed in the shape of a funnel in such a manner that a portion of the multigrain mixture does not remain in the stirring and washing container 125 after the discharging is performed. A cross-sectional area of the lower end portion thereof decreases toward the discharging outlet port. Accordingly, the multigrain mixture and the water for meal cooking that are accommodated in the stirring and washing container 125 may be discharged into a cooking container 191 arranged under the stirring and washing container 125.

In a case where the grain dispenser 10 according to the embodiment of the present disclosure further includes the cooking unit 190, the grain dispenser 10 may further include a cooking unit 192 for heating the cooking container 191 or applying pressure thereto. In this case, the controller 100 may further control the cooking unit 192 in order to heat the cooking container 191 and apply pressure thereto. Under the control of the cooking unit 192, the meal may be cooked using the multigrain mixture and the water for meal cooking that are accommodated in the cooking container 191.

The grain dispenser 10 according to the embodiment of the present disclosure may include the sensor unit 130 that includes at least one sensor. The sensor unit 130 here may include at least one of an infrared (IR) sensor, an optical sensor (for example, a camera), a temperature sensor, and a weight sensor.

As an example, the sensor unit 130 may include a grain identification sensor 131 for identifying kinds of grain that are stored in the storage hoppers, respectively. The grain identification sensor here may be a camera. In this case, the controller 100 may identify kinds of grain that are stored in the storage hoppers, respectively, on the basis of shapes of the kinds of grain inside the storage hoppers that are acquired through the camera. To this end, the controller 100 may identify regions corresponding to the storage hoppers, respectively, from the image acquired from the camera and may identify the kinds of grain that are stored in the storage hoppers, respectively, through results of performing grain identification on the identified regions. In addition, the camera may be provided in each of the storage hoppers. In this case, the controller 100 may perform the grain identification on images that are acquired from the cameras, respectively, and thus may identify the kinds of grain that are stored in the storage hoppers, respectively. In a case where the grain identification sensor is used in this manner, various kinds of grain that are in the storage hoppers, respectively, may be automatically identified.

In addition, the sensor unit 130 may include at least one sensor (hereinafter referred to as a "moisture-content ratio sensor") for measuring a moisture content ratio of the grain that is stored in the storage hopper. For example, the moisture-content ratio sensor may be a camera that uses predetermined light. The predetermined light here may be infrared light. An amount of moisture contained in the grain, that is, the moisture content ratio may be measured on the basis of an amount of the camera-emitted infrared light absorbed in the moisture contained in the grain stored in the storage hopper.

In addition, the moisture content ratio may be measured according to an impedance characteristic of the grain. In this case, the moisture-content ratio sensor may be configured with two electrodes forming a circuit. In this case, the lower moisture content between the two electrodes, the more increased a value of impedance. Therefore, in a case where impedance of the grain positioned between the two electrodes is measured, the lower the moisture content ratio of the grain, the higher value of the impedance may be measured. That is, the moisture content ratio of the grain may be measured according to a result of measuring the impedance of the grain.

In addition, the sensor unit 130 may include at least one sensor (hereinafter referred to as a water supply sensor) that is capable of an amount of water that is supplied to the stirring and washing container 125. In this case, the water supply senser may be a sensor that measures the time for which water is supplied by the water supply unit 121 water in a case where the amount of water that is supplied is constant. In this case, the amount of water supplied to the stirring and washing container 125 may be computed by multiplying the amount of water that is supplied on a per-hour basis, by the time for which water is supplied.

In addition, the water supply sensor may be a weight sensor that measures a weight of the stirring and washing container 125. In this case, the water supply sensor may measure a difference in a weight that the stirring and washing container 125 has before water is supplied (for example, when washing is performed one time and then draining is completed) and a weight that the stirring and washing container 125 has after water begins to be supplied, and thus may measure the amount of water that is supplied to the stirring and washing container 125.

In addition, the sensor unit 130 may include at least one weight sensor (a residual-amount sensor) for measuring residual amounts of kinds of grain that remain in the storage hoppers, respectively, on the basis of weights of the storage hoppers. In a case where, as a result of the measurement by the residual-amount sensor, it is determined that a residual amount of one kind of grain is smaller than a preset margin amount thereof, the controller 100 may output alerting information for alerting the user to this fact and may perform a purchase process for purchasing the kind of grain of which the residual amount is insufficient, according to user selection.

The grain dispenser 10 according to the embodiment of the present disclosure may include the communication unit 140 that includes at least one communication module for performing communication in a preset scheme.

The communication unit 140 may include at least one of a short-range communication module for short-range communication and a wireless Internet module for a wireless Internet connection.

The wireless Internet module here refers to a module for wireless connection over the Internet. The wireless Internet module may be built into the grain dispenser 10 or be installed outside the gain dispenser 10. The wireless Internet module is configured in such a manner as to transmit and receive a wireless signal over a communication network in compliance with wireless Internet technologies. Various Internet technologies may be employed, such as Wireless LAN (WLAN), Wireless-Fidelity (Wi-Fi), and Long Term Evolution-Advanced (LTE-A). Therefore, the grain dispenser 10 may conduct a search through the wireless Internet connection or may make a connection to a preset external sever, and thus be provided with information provided by the preset external server.

In addition, the short-range communication module is for a short-range communication. Various short-range communication technologies may be employed, such as Bluetooth™, Radio Frequency Identification (RFID), and Infrared Data Association (IrDA). The grain dispenser 10 may exchange data with at least one different apparatus arranged in the vicinity of the grain dispenser 10 by performing wireless communication therewith through the short-range communication module.

The input unit 150 may include at least one input device for receiving information, as input, from the user. Examples of the input device may have a microphone that is capable of receiving the voice command from the user. In addition, the examples of the input device may include a touch-type input unit that is configured with buttons or with virtual keys, soft keys, or visual keys that are displayed on a touch screen.

The output unit 160 may serve to generate an output associated with audio, video, tactile sensation, or the like and may include at least one of a display unit 161 and an audio output unit 162. The display unit 161 may be combined with the touch sensor in a layered manner or be integrally formed with the touch sensor and thus may be realized as the touch screen. The touch screen may function as the input unit 150 that provides an input interface between the grain dispenser 10 and the user and, at the same time, may provide an output interface between the grain dispenser 10 and the user.

Information that is processed in the grain dispenser 10 is displayed (output) on the display unit 151. For example, the grain dispenser 10 may display execution screen information of an application or an application program that is executed on a mobile terminal 100, or user interface (UI) information or graphic user interface (GUI) information that varies with the execution screen information.

In addition, the audio output unit 162 may output an audio signal associated with a function (for example, information for alerting the user that the macerating is completed, information for alerting the user that the residual amount is insufficient, or the like) that is performed in the grain dispenser 10. To this end, the audio output unit 162 may include an audio information output unit, such as a speaker.

Data that support various functions of the grain dispenser 10 are stored in the memory 170. Data and commands for various application programs or applications that are executed on the grain dispenser 10 and for operation of the grain dispenser 10 may be stored in the memory 170. For example, identification information on each of many users and "personalized data" learned for each of the many users, that is, customized data, may be stored in the memory 170. In this case, the customized data may include at least one of an amount of the meal, a kind of miscellaneous grain, and a rice-miscellaneous-grain mixture ratio that are preferred by each user. In addition, information for measuring a moisture content ratio of each of the kinds of grain, and an amount of water for meal cooking and the macerating time that are determined according to the measured moisture content ratio of each of the kinds of grain may be stored in the memory 170.

In addition to the operation associated with the application program, the controller 100 controls normal operation of the grain dispenser 10. The controller 100 controls the constituent elements described above or determines a suitable amount of grain and a suitable multigrain mixture ratio according to the data stored in the memory 170. Then, the controller 100 controls at least one of the washing time, the number of times of washing, the amount of water for meal cooking, and the macerating time, according to the measured moisture content ratio of the grain. Thus, a multigrain mixture that is macerated in state of being customized for an individual user may be provided.

The artificial intelligence unit 180 may include at least one module that serves to process pieces of information on the basis of an artificial intelligence technology and performs at least one of information learning, information inference, information perception and natural language processing.

The learning here may be performed through a machine learning technology. The machine learning technology is a technology that, on the basis of at least one algorithm, collects and learns a large amount of information and determines or predicts information on the basis of the learned information. The information learning refers to an operation of recognizing features of pieces of information, rules, a determination reference, and the like, quantifying a relationship between the pieces of information, and predicting new data using a quantified pattern.

The algorithm used in the machine learning technology may be an algorithm based on statistics. Examples of the algorithm may include a decision tree in which a tree structure is used as a prediction model, an artificial neural network that imitates a structure and function of a neural network of a living organism, genetic programming based on an evolutionary algorithm of the living organism, clustering in which an observed example is distributed to subsets, called clusters, the Montercarlo method in which a function value is computed with probability through randomly extracted random sampling numbers, and the like.

A deep learning technology belongs to one field of the machine learning technology and is a technology that performs at least one of learning, determination, and processing of pieces of information using an artificial neural network algorithm. The artificial neural network may have a structure that connects one layer to another and transfers data from one layer to another. With the deep learning technology, a large amount of information may be learned through an artificial neural network using a graphic processing unit (GPU) optimized for parallel operation.

In the present specification, the artificial intelligence unit 180 and the controller 100 may be understood as the same constituent element. In this case, a function that is performed by the controller 100 described in the present specification may be described as being performed by the artificial intelligence unit 180. The controller 100 may be named the artificial intelligence unit 180. Conversely, the artificial intelligence unit 180 may be named the controller 100.

In addition, in the present specification, the artificial intelligence unit 180 and the controller 100 may be understood as constituent elements separately from each other. In this case, the artificial intelligence unit 180 and the controller 100 may exchange data with each other and thus may perform various controls in the grain dispenser 10. On the basis of a result derived in the artificial intelligence unit 180, the controller 100 may perform at least one function of functions that are capable of being performed in the grain dispenser 10 or may control at least one of the constituent elements of the grain dispenser 10. Moreover, the artificial intelligence unit 180 may be operated under the control of the controller 100.

As described above, the food texture of the grain food may be determined according to the moisture content ratio of the grain. Therefore, the food texture of the food needs to be kept constant in order to keep the moisture content ratio of the grain constant.

However, in a case where a temperature for storage is high, the moisture content ratio of the grain may be quickly decreased. Therefore, in order to keep the moisture content ratio of the grain constant, the grain needs to be stored at a low temperature. Accordingly, although not illustrated, the grain dispenser 10 according to the embodiment of the present disclosure may further include a cooling unit for refrigerating a plurality of storage hoppers in which kinds of grain, respectively, are stored and may further include a temperature sensor for measuring the storage unit including the plurality of storage hoppers.

Figure 4:
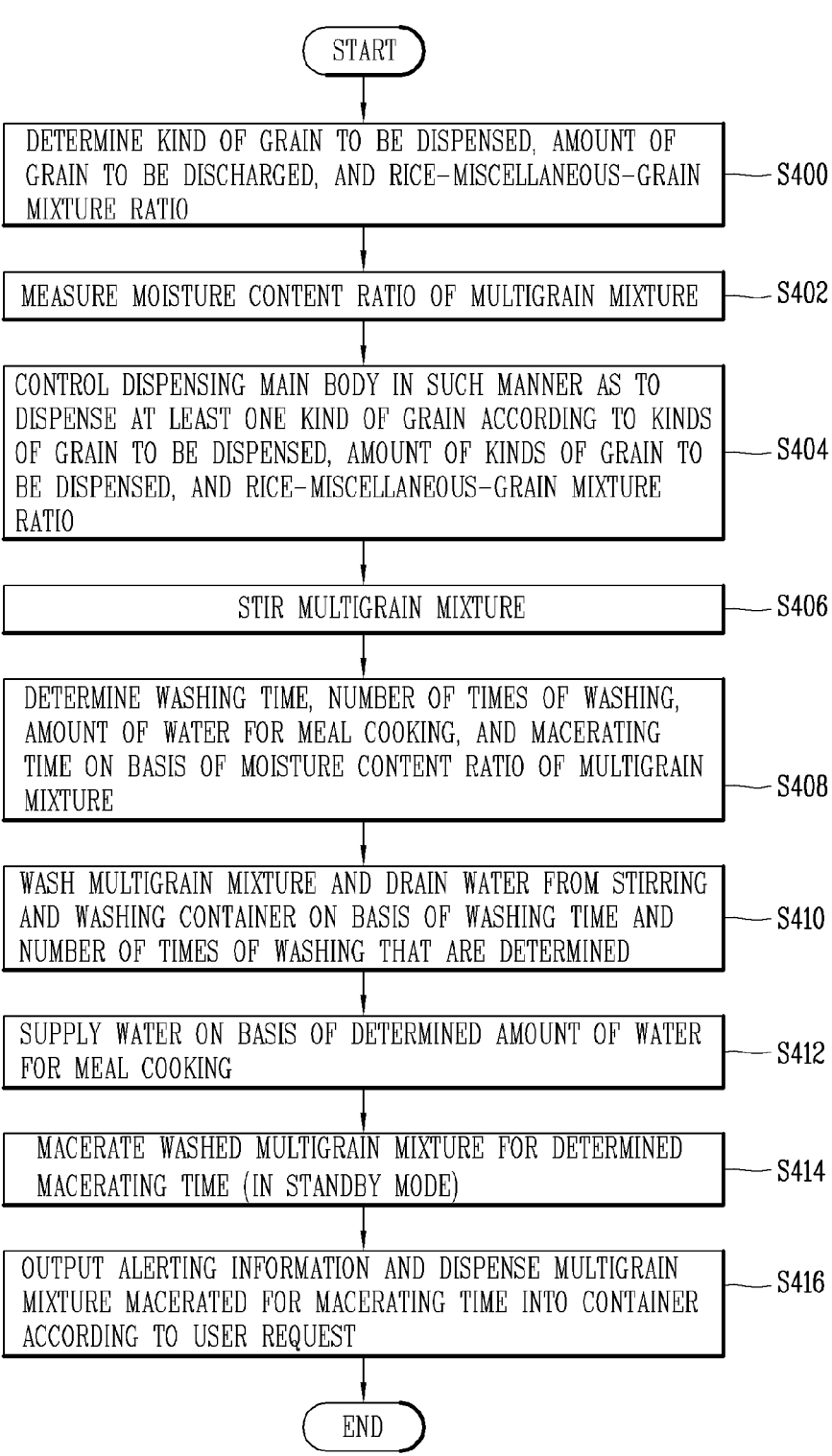
FIG. 4 is a flowchart illustrating a process in which the grain dispenser according to the embodiment of the present disclosure operates.

FIG. 4 is a flowchart illustrating a process in which the grain dispenser 10 according to the embodiment of the present disclosure operates. FIGS. 5A and 5B are views illustrating each illustrating an example of a measurement unit that measures the moisture content ratio of the grain stored in the storage unit in the grain dispenser 10 according to the embodiment of the present disclosure. For convenience in description, description is provided on the assumption that the user makes a request through the voice command.

First, with reference to FIG. 4, when receiving the voice command from the user, the controller 100 of the grain dispenser 10 according to an embodiment of the present disclosure may identify the received voice command through natural language processing (NLP) and may identify the user request using a dialog technique through the NLP. Kinds of grain to be dispensed, an amount of the kinds of grain to be dispensed, and a rice-miscellaneous-grain mixture ratio can be determined from the identified user request (S400).

As an example, in Step S400, in a case where the voice command received from the user includes an amount of the meal or a kind of miscellaneous grain to be mixed with rice, or a rice-miscellaneous-grain ratio, the controller 100 may determine the kind of grain to be dispensed, the amount of the grain to be dispensed, and the rice-miscellaneous-grain mixture ratio on the basis of the identified voice command. However, in a case where the kind of miscellaneous grain to be mixed with rice is not designated or where the rice-miscellaneous-grain mixture rate, the amount of the meal, or the like is not included in the voice command, the controller 100 may determine the amount of the meal, the miscellaneous grain to be mixed with rice or the kind of miscellaneous grain to be mixed with rice, or the rice-miscellaneous-grain ratio on the basis of the learned data of the user identified through the voice command, that is, on the basis of the customized data.

For example, in a case where information on the amount of the meal is not included, the controller 100 may measure the amount of the meal that is preferred by the user, from the customized data of the user that is identified through the voice command. Then, a total amount of kinds of grain to be dispensed, that is, the amount of grain to be dispensed may be determined according to the amount of the meal that is measured from the customized data. In a case where the voice command from the user includes information associated with a particular time, such as "before," "yesterday," morning," the controller 100 may search for a grain dispensing record corresponding to the particular time and may determine the amount of grain to be dispensed on the basis of the found grain dispensing record.

At this point, in a case where the voice command from the user includes a request to change a previous dispensing record, the controller 100 may make a request to the user for a change request item through a dialog function. Then, according to the change request item received from the user, the amount of the meal or the kind of miscellaneous grain to be mixed with rice, or the rice-miscellaneous-grain ratio may be changed that is measured from the grain dispensing record corresponding to the particular time or from the customized data of the user.

As an example, in a case where the user utters the voice command "Put more barley in than yesterday evening" or "Put more barley in than usual," the controller 100 may measure an amount of grain to be dispensed and a grain dispensing ratio from a grain dispensing record at the particular time "yesterday evening" that is recognized from the voice command, or may measure the amount of grain to be dispensed and the grain dispensing ratio from the customized data of the user on the basis of the meaning of the word "usual" that is recognized from the voice command.

Then, on the basis of the words "barley," and "more" included in the voice command, the controller 100 may determine that the voice command from the user includes a change request for increasing an amount of barley. Then, the controller 100 may generate a natural language response sentence, such as "Do you like to add barely by 10% with respect to the other kind of grain and may check whether or not the multigrain mixture ratio to be changed is consistent with the change request from the user. Then, in a case where the user utters a positive response (for example, "Yes," "Sure," or the like), an amount of barley may be increased to 10% with respect to the other kind of grain on the basis of a response from the user. In this case, an amount of rice may be decreased in a manner that corresponds to an increase in the amount of barley.

When the kind of grain to be dispensed and the amount of the grain to be dispensed, and the rice-miscellaneous-grain mixture ratio are determined in Step S400, the controller 100 may measure a moisture content ratio of at least one of rice and miscellaneous grain (S402).

As described above, the moisture content ratio may be measured through the moisture content ratio sensor that is included in the sensor unit 130. The moisture content ratio sensor may be a camera that is capable of detecting predetermined light. FIG. 5A illustrates an example of a camera-type moisture content ratio sensor 500.

With reference to FIG. 5A, the camera-type moisture content ratio sensor 500 according to an embodiment of the present disclosure may be formed in such a manner as to detect the predetermined light, for example, an infrared light image from the grain stored in the storage hopper. To this end, the camera-type moisture content ratio sensor 500 may emit infrared light at a preset angle of view, and an image that results from the emitted infrared light being reflected by the grain may be acquired. The infrared light here has a property of being absorbed in moisture. Therefore, an amount of moisture content that becomes larger as an amount of the infrared light reflected by the grain, that is, an amount of infrared reflection light becomes smaller may be measured. In addition, the amount of moisture content that become smaller as the amount of the infrared light reflected by the grain, that is, the amount of infrared reflection light becomes larger may be measured.

As described above, the moisture content ratio sensor may be an impedance sensor that uses two electrodes. FIG. 5B illustrates an example of an electrode-type moisture content ratio sensor 501.

The left portion of FIG. 5B is a cross-sectional view illustrating a lateral side of the storage hopper including the electrode-type moisture content ratio sensor 501 according to the embodiment of the present disclosure. The right portion of FIG. 5B is a plan view illustrating the storage hopper including the electrode-type moisture content ratio sensor 501 according to the embodiment of the present disclosure.

More specifically, it is desirable that the electrode-type moisture content ratio sensor 501 according to the embodiment of the present invention may be formed on a lower end portion of the storage hopper that is connected to the dispensing pipe 114. As illustrated in FIG. 5B, an outlet portion of the storage hopper that is connected to the dispensing pipe 114 has a smaller area than an inlet portion thereof through which grain is put into the storage hopper. Because of this, the electrode-type moisture content ratio sensor 501 may be mounted although the area of the outlet portion is smaller, and a grain density becomes high due to the force of gravity. Therefore, as illustrated in FIG. 5B, in a case where the electrode-type moisture content ratio sensor 501 is mounted on the lower end portion of the storage hopper, due to the force of gravity, the grain may naturally pass between both electrodes 510 and 520 that constitute the electrode-type moisture content ratio sensor 501. In addition, it is possible that the moisture content ratio of the grain is measured more accurately due to a high grain density.

As illustrated in FIGS. 5A and 5B, the moisture content ratio sensors may be mounted in such a manner as to correspond to a plurality of storage hoppers, respectively. In this case, the controller 100 may measure the moisture content ratio on a per-kind-of-grain basis on the basis of each of the results of sensing by the moisture content ratio sensors. Moreover, a moisture content ratio of the entire multigrain mixture may be computed by reflecting the measured moisture content ratio of each of the types of grain according to the multigrain mixture ratio determined in Step S400.

At this point, in a case where the moisture content ratio sensor is the camera-type moisture content ratio sensor 500, the controller 100 may measure the moisture content ratios of the kinds of grain that are stored in the storage hopper, respectively, from infrared reflection light images of all the storage hoppers. In this case, the controller 100 may identify regions corresponding to the storage hoppers, respectively, from the infrared reflection light images acquired by the camera-type moisture content ratio sensor 500 and may identify the moisture content ratios of the kinds of grain that are stored in the storage hoppers, respectively, through amounts of infrared reflection light reflected from the recognized regions, respectively.

As described above, the amount of moisture content is measured on a per-storage hopper basis, but the controller 100 may determine the moisture content ratio of the entire multigrain mixture on the basis of any one moisture content ratio.

As an example, only in a case where an amount of one kind of grain in the multigrain mixture ratio determined in Step S400 is at a preset level or higher when compared with an amount of the other kind of grain, the controller 100 may designate the one kind of grain as a representative kind of grain. In this case, the moisture content ratio of the entire multigrain mixture may be determined according to a moisture content ratio of the representative kind of grain. In a case where an amount of rice is at a preset level or higher when compared with another kind of miscellaneous grain, such as when a ratio of rice to miscellaneous grain is 8:2, the controller 100 may determine the moisture content ratio of rice as the moisture content ratio of the entire multigrain mixture.

Alternatively, the controller 100 may determine the moisture content ratio of the multigrain mixture according to a moisture content ratio of a specific kind of grain that is designated as the representative kind of grain. In this case, the representative kind of grain may be rice whose amount is the largest in the multigrain mixture ratio. In this case, the moisture content ratio sensor may be mounted on only one storage hopper in which the rice is stored.

When the moisture content ratio of the multigrain mixture is determined in Step S402, the controller 100 may control the dispensing main body 112 in such a manner that at least one kind of grain is dispensed according to the kinds of grain to be dispensed, the amount of the kinds of grain to be dispensed, and the rice-miscellaneous-grain mixture ratio that are determined in Step S400 (S404).

At this point, the controller 100 may determine an amount of each individual kind of grain to be dispensed on the basis of the amount of grain to be dispensed and the multigrain mixture ratio. Then, a plurality of screw actuators are controlled according to the determined amount of each individual kind of grain to be dispensed, and thus the screw shafts that correspond to the plurality of storage hoppers, respectively, in which the kinds of grain are stored, respectively, may be rotated in one direction. Then, as the screw shafts are rotated, amounts of kinds of grain that, respectively, correspond to amounts of individual kinds of grain to be dispensed may be dispensed from the dispensing outlet ports, respectively. Then, the kinds of grain that are dispensed may be guided by the guide unit 126, and thus may be introduced into the stirring and washing container 125.

When, through the dispensing process in Step S404, the kinds of grain that are dispensed according to the amounts of individual kinds of grain, respectively, are introduced into the stirring and washing container 125, the controller 100 may stir the kinds of grain that are introduced (S406). To this end, the controller 100 may repeatedly perform the process of rotating the kinds of grain alternately in one direction by a predetermined angle and in a direction different from the one direction by a predetermined angle and thus may stir the kinds of grain introduced into the stirring and washing container 125.

When the stirring is completed in Step S406, the controller 100 may determine at least one of the washing time for washing the multigrain mixture (for example, the washing time for washing the multigrain mixture is determined according to the number of times that the stirring and washing container 125 is rotated for one-time washing), the number of times of washing, the amount of water for meal cooking, and the macerating time, according to the moisture content ratio of the multigrain mixture that is computed in Step S402 (S408).

As described above, the moisture content ratio of the grain is one factor for determining the food texture of the meal. When the moisture content ratio of the grain is too low, the meal is half-boiled or a surface of the grain is too hardened. When the moisture content ratio of the grain is too high, the meal is sticky, and the food texture of the meal is too softened. Accordingly, in a case where the moisture content ratio of the multigrain mixture is high, the controller 100 may decrease the amount of water for meal cooking and the macerating time, and thus may decrease an amount of moisture absorbed in the grain while cooking the meal. In a case where the moisture content ratio of the multigrain mixture is low, the controller 100 may increase the amount of water for meal cooking and the macerating time, and thus may increase an amount of moisture absorbed in the grain while cooking the meal.

The amount of water for meal cooking and the macerating time that are determined according to different moisture content ratios of the multigrain mixture may be determined through many experiments with the embodiment of the present disclosure. To this end, a moisture content ratio table may be stored in the memory 170. The moisture content ratio table contains information on the amount of water for meal cooking and the macerating time that vary according to different moisture content ratios of the multigrain mixture. The controller 100 may determine the amount of water for meal cooking and the macerating time that correspond to the moisture content ratio of the multigrain mixture that is determined in Step S402, on the basis of the moisture content ratio table stored in the memory 170.

The moisture content ratio table may further contain information on the washing time and the number of times of washing. In this case, the washing time and the number of times of washing may also vary according to the moisture content ratio of the multigrain mixture. For example, in a case where the amount of moisture content is high, the washing time or the number of times of washing may be decreased. In contrast, in a case where the amount of moisture content is low, the washing time or the number of times of washing may be increased.

When, in Step S408, at least one of the washing time, the number of times of washing, the amount of water for meal cooking, and the macerating time is determined according to the amount of moisture content of the multigrain mixture, the controller 100 may wash the multigrain mixture accommodated in the stirring and washing container 125 and may drain the water from the stirring and washing container 125 (S410).

When, in Step S408, the washing of the multigrain mixture and the draining of the water from the stirring and washing container 125 are completed, on the basis of the amount of water for meal cooking that is determined in Step S406, the water supply unit 121 may be controlled in such a manner that water is supplied to the stirring and washing container 125 (S412). When an amount of water supplied that is measured through the water supply senser reaches the determined amount of water for meal cooking, the controller 100 may end the water supply.

In a case where as much water as the amount of water for meal cooking is supplied, in a state where the multigrain mixture is soaked in the supplied water, the controller 100 may be on standby for the macerating time determined in Step S408, in such a manner that the multigrain mixture is macerated (S414). To this end, the controller 100 may count an elapsed time in a state where as much water as the amount of water for meal cooking is supplied to the stirring and washing container 125 and, according to a result of the counting, may check whether or not the macerating time expires.

In a case where the macerating time expires, the alerting information for alerting the user that the macerating time expires may be output, the discharging stopper on the stirring and washing container 125 may be open, and thus the multigrain mixture macerated for the macerating time may be discharged through the discharging outlet port in the stirring and washing container 125 (S416).

At this point, after the alerting information is output, according to only the user request, the controller 100 may open the discharging stopper on the stirring and washing container 125. Therefore, the sufficient time for the user to arrange the cooking container may be secured, and the water for meal cooking and the macerated multigrain mixture can be prevented from being discharged in a state where the cooking container is not arranged.

As described above, in Step S408, the amount of water for meal cooking and the macerating time may be automatically determined according to the moisture content ratio of the multigrain mixture. However, of course, according to the user request, the amount of water for meal cooking and the macerating time that are determined may be changed.

To this end, Step S408 may further include a step of displaying, for the user, information on the washing time and the number of times of washing that are determined according to the measured moisture content ratio of the multigrain mixture, and information on the amount of water for meal cooking and the macerating time. In this case, the controller 100 may output, in voice for the user, the information on the washing time and the number of times of washing, the information on the amount of water for meal cooking and the macerating time, and information for asking whether or not to proceed with cooking the meal.

In a case where the user makes a request to proceed with cooking the meal according to the information on the washing time and the number of times of washing that are displayed or outputted as audio information, and the information on the amount of water for meal cooking and the macerating time (for example, in a case where a positive answer, such as "Yes," "Sure," or "That's OK," is received in voice), the controller 100 may perform the washing and the macerating in subsequent steps according to the washing time and the number of times of washing that are determined in Step S408, and the amount of water for meal cooking and the macerating time.

However, in a case where the user makes a negative response (for example, "No" or the like), the controller 100 may make a direct request to the user for information to be changed, such as "Please tell me what you want to change." In addition, in a case where the user makes a request to change at least one of the amount of water for meal cooking and the macerating time that are displayed, and the amount of water for meal cooking and the macerating time (for example, "Increase the macerating time by a little"), at least one of the amount of water for meal cooking and the macerating time, and the amount of water for meal cooking and the macerating time may be changed according to the user request. When necessary in this case, a request may be additionally made for confirmation by outputting voice information associated with what the user wants to change (for example, "Would you like to increase the macerating time by 10%").

In a case where, in this manner, at least one of the washing time, the number of times of washing, the amount of water for meal cooking, and the macerating time is changed according to the user request, the controller 100 may utilize this fact as the learning data of the customized data. Therefore, as described above, in a case where the sufficient number of times that the amount of water for meal cooking, the macerating time, and the like are changed by the user is reached, the controller 100 may determine the amount of water for meal cooking, the macerating time, and the like according to the learned data in Step S408. Therefore, although the moisture content ratios of the grain are the same, the amount of water for meal cooking, the macerating time, and the like may be customized in such a manner that the meal is cooked according to the user's preference on a per-user basis.

As described above, the grain dispenser 10 according to the embodiment of the present disclosure may measure the weights of the storage hoppers and thus may measure the residual amounts of the kinds of grain that remain in the storage hoppers, respectively.

FIG. 6 is a flowchart illustrating a process in which the grain dispenser 10 according to the embodiment of the present disclosure operates to purchase a kind of grain according to a result of measuring the residual amount thereof.

With reference to FIG. 6, in a case where the dispensing main body 112 is controlled in such a manner as to dispense at least one kind of grain according to the kinds of grain to be dispensed, the amount of the kinds of grain to be dispensed, and the multigrain mixture ratio that are determined in Step S400 in FIG. 4, the controller 100 of the grain dispenser 10 may measure the weights of the storage hoppers and thus may measure the residual amounts of kinds of grain that remain in the storage hoppers, respectively (S600). As an example, the controller 100 may measure the residual amounts of kinds of grain by deducting preset weights of the storage hoppers from the measured weights, respectively, of the storage hoppers.

Then, the controller 100 may compute respective averages of amounts of rice and miscellaneous grain that, for a preset period of time, are requested and consumed by the user (S602). The user for whom the average consumption amounts are computed means not only the user who currently utters the voice command, but also all users who are pre-registered. That is, Step S602 may be a step of computing an average amount of dispensed rice or miscellaneous grain in a case where rice or miscellaneous grain is dispensed, regardless of the user. In addition, Step S602 may be a step of computing an average amount of dispensed grain on a per-storage hopper basis, and may be a step of computing an average consumption amount on the basis of each type of grain that is stored.

When the average consumption amounts of kinds of grain are computed in Step S602, the controller 100 may compute a minimum reserve amount on a per-grain basis by adding a preset margin to the computed average amount of consumed grain (S604). The preset margin may be determined in a manner that varies from one kind of grain to another. For example, a kind of grain, such as rice, that is consumed in large amount on average may be set to have a large margin, and a kind of grain that, due to low preference, is consumed in small amount on average may be set to have a small margin. As an example, the preset margin may be determined as a multiple of the average consumption amount.

When the minimum reserve amount is computed on a per-grain basis in Step S604, the controller 100 may compare the computed minimum reserve amount on a per-grain basis and the residual amount of the kind of grain that remains in each of the storage hoppers with each other. Then, it may be detected whether or not a kind of grain whose residual amount is smaller than a minimum reserve amount of the corresponding kind of grain is present among kinds of grain that are stored in the storage hoppers, respectively (S606). In a case where a kind of grain of which a residual amount is smaller than the minimum reserve amount of the corresponding kind of grain is absent, proceeding to S406 in FIG. 4 may take place without performing a grain purchase process.

In contrast, in a case where a kind of grain of which a residual amount is smaller than the minimum reserve amount of the corresponding kind of grain is present as a result of the detection in Step S606, the controller 100 may output the alerting information for alerting the user that a kind of grain of which a residual amount is insufficient is present (S608). In this case, the alerting information may include a request to the user to check whether or not a kind of grain of which a residual amount is insufficient is purchased.

In a case where, in response to the alerting information, the user makes a selection for purchasing the kind of grain of which the residual amount is insufficient, the controller 100 may perform a process of purchasing the corresponding kind of grain (the kind of grain of which the residual amount is insufficient) (S610). In this case, the controller 100 may execute a built-in purchase application and may place an order for and pay for the corresponding kind of grain according to the voice command from the user. The controller 100 may make a connection to a preset external terminal through the short-range communication module and may provide the external terminal with information on the corresponding kind of grain and search information of on-line stores from which the corresponding kind of grain can be bought, and thus the user can purchase the corresponding kind of grain through the external terminal. In this case, the external terminal may be a mobile terminal, a computer, or the like of the user.

The grain dispenser 10 according to the embodiment of the present disclosure may provide various menus from which an amount of grain to be dispensed for one person and a rice-miscellaneous-grain ratio that are preset according to the user's preference. The menus may be displayed on a display unit 161 of the grain dispenser 10, and setting from the menus may be completed according to the user input through the input unit 150. In addition, the displaying of the menu and the setting from the menu may be performed through a touch screen of the grain dispenser 10. The displaying of the menu and settings by the user will be described in detail below. For convenience in description, the displaying of the menu and the setting from the menu are assumed to be performed through the touch screen of the grain dispenser 10.

Figure 7:
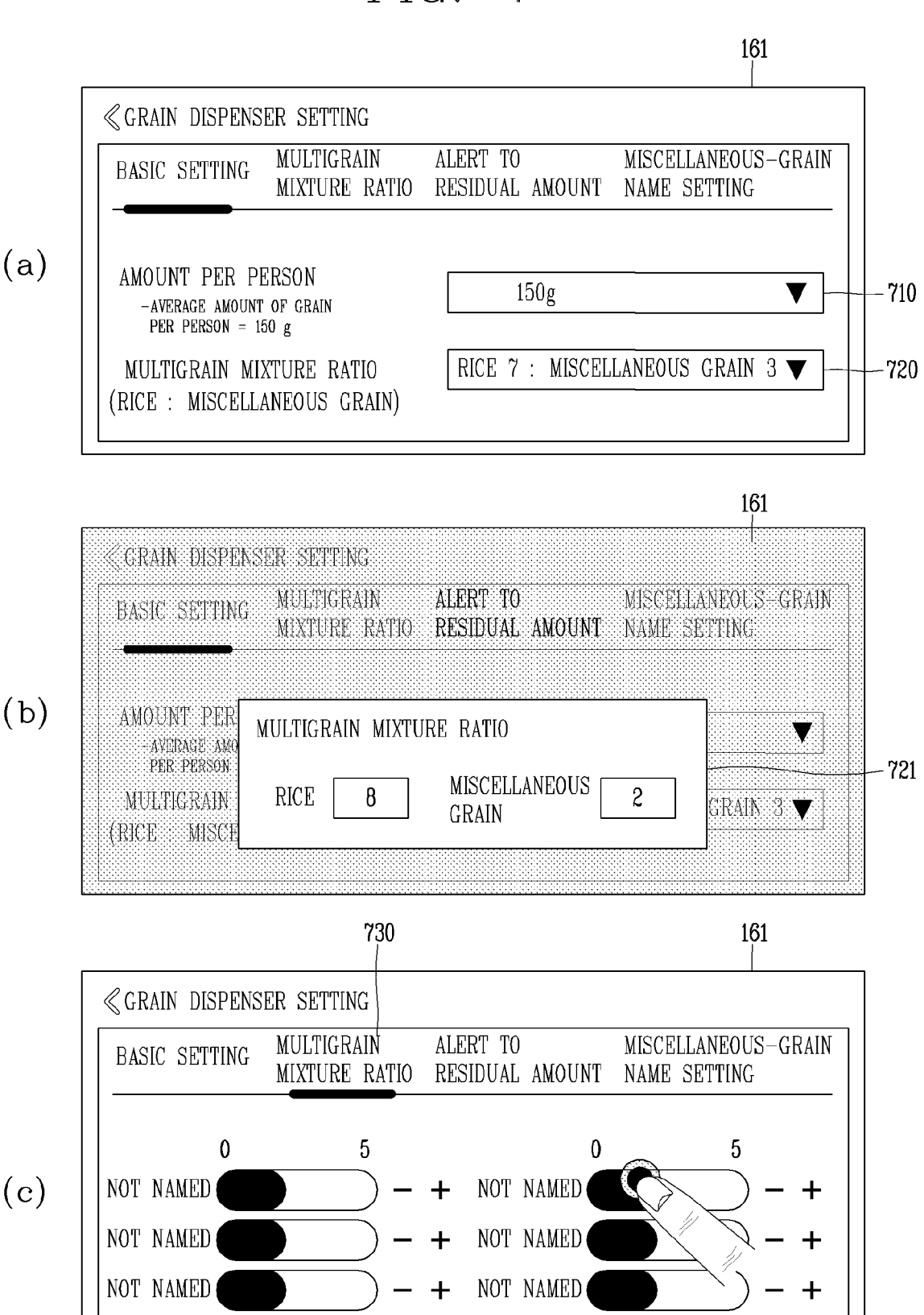
FIGS. 7A, 7B, and 7C are views each illustrating an example where a user sets a multigrain mixture ratio in the grain dispenser according to the embodiment of the present disclosure.

FIGS. 7A, 7B, and 7C are views each illustrating an example where the use sets the amount of grain to be dispensed for one person and the multigrain mixture ratio in the grain dispenser 10 according to the embodiment of the present disclosure.

First, FIG. 7A is a menu screen for basic setting of the grain dispenser 10 and illustrates an example of a menu 710 from which the user can set the amount of grain to be dispensed for one person and an example of a menu 720 from which the user can set the rice-miscellaneous-grain ratio.

As illustrated in FIG. 7A, the user may directly set the amount of grain to be dispensed for one person (a size for serving). In this case, when the user does not set the amount of grain to be dispensed for one person, the amount of grain to be dispensed for one person may be set to 150 g that is a basic setting value. However, the user applies touch input to the menu 710 for setting the amount of grain to be dispensed for one person, the controller 100 may change the amount of grain to be dispensed for one person according to the user input. In this case, the changed amount of grain to be dispensed for one person may be learned and stored as the customized data of the currently identified user.

In addition, the grain dispenser 10 according to the embodiment of the present disclosure, as illustrated in FIG. 7B, may change the rice-miscellaneous-grain mixture ratio according to the user selection.

For example, as illustrated in FIG. 7A, the rice-miscellaneous-grain mixture ratio may be basically set to 7 (rice):3 (miscellaneous grain). In this case, when the user applies the touch input to the menu 720 for setting the rice-miscellaneous-grain mixture ratio, the controller 100, as illustrated in FIG. 7B, may change the rice-miscellaneous-grain mixture ratio (8:2) according to the user input (721). In this case, the rice-miscellaneous-grain mixture ratio (8:2) may be learned and stored as the customized data of the currently identified user.

The grain dispenser 10 according to the embodiment of the present disclosure may provide a menu from which a ratio of miscellaneous grain to be mixed with rice is limited more specifically. For example, in a case where the user selects a tap 730 for a "rice-miscellaneous-grain ratio" on the menu screen in FIG. 7A, the controller 100, as illustrated in FIG. 7C, may display a menu from which an amount of each kind of grain (for example, "2" in 8:2 (the rice-miscellaneous-grain mixture ratio)) in a designated multi-grain mixture ratio is determined.

Items on a menu illustrated in FIG. 7C may correspond to kinds of grain, respectively, that are stored in different storage hoppers. In this case, in a case where the user selects an item "+" or increases a length of a bar for a specific item, an amount of a kind of grain that is stored in a specific storage hopper may be increased. For example, in a case where a length of a specific bar is set to 5 that is a maximum value, a kind of grain that corresponds to the bar having this value of 5 may be set to account for 50% of a total amount of grain. In contrast, in a case where the user selects an item "−" or decreases a length of a bar for a specific item, an amount of a kind of grain that is stored in a specific storage hopper may be decreased. For example, in a case where a length of a specific bar is set to 0 that is a minimum value, a kind of grain that corresponds to the bar having this value of 0 may not be dispensed.

As illustrated in FIG. 7C, in a state where kinds of grain that are stored in the storage hoppers, respectively, are not identified, the kinds of grain may be expressed as "no named." In this case, the controller 100 may identify a kind of grain that is stored in each of the storage hoppers, according to the user input or automatically, and may assign a name of each of the kinds of grain according to the identified kind of grain.

Figure 8:
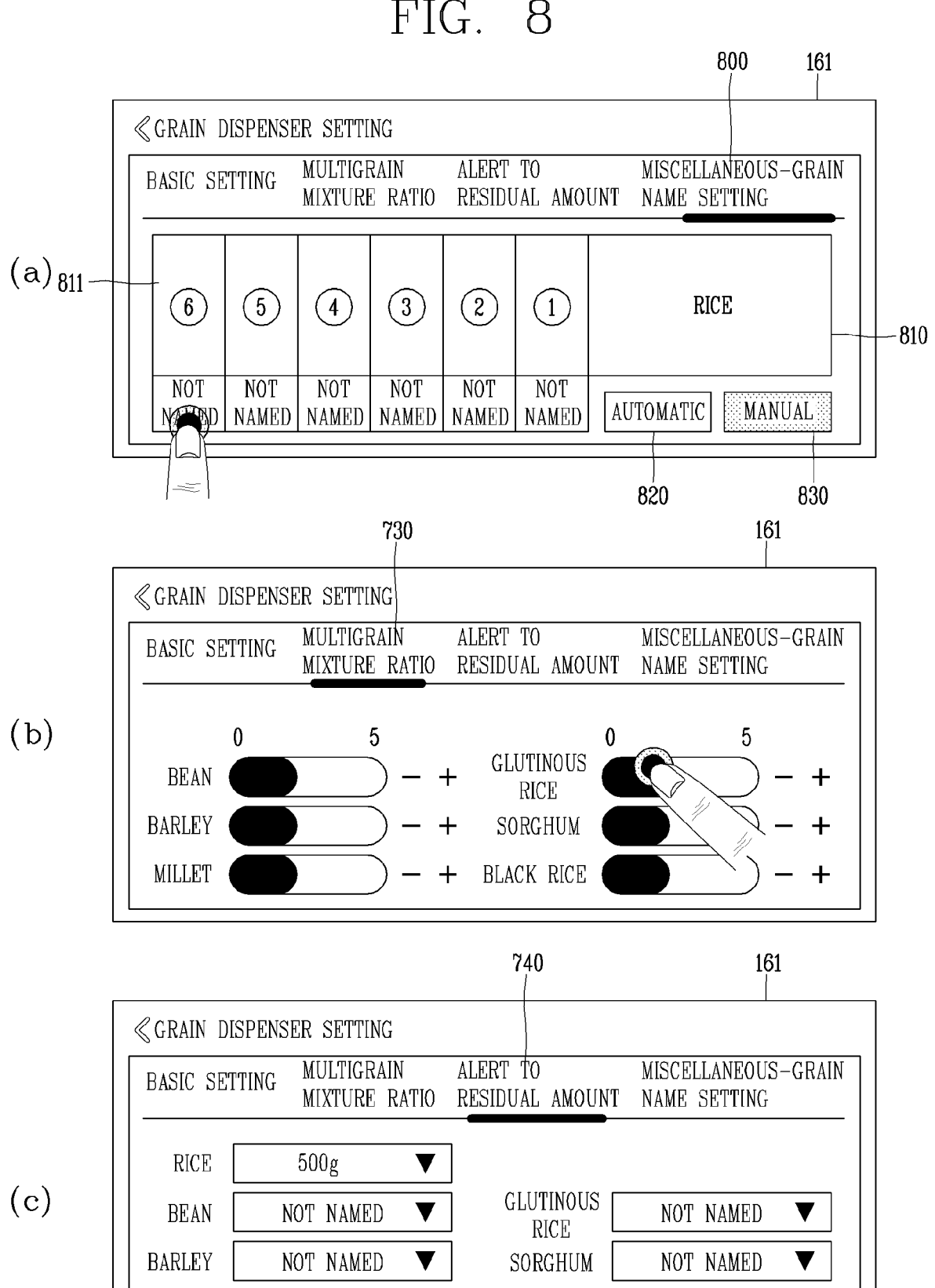
FIGS. 8A, 8B, and 8C are views each illustrating an example where information on kinds of grain that are stored in a storage unit is input in the grain dispenser according to the embodiment of the present disclosure.

FIGS. 8A, 8B, and 8C are views each illustrating an example where information on kinds of grain that are stored in the storage unit 111 is input in the grain dispenser 10 according to the embodiment of the present disclosure.

First, with reference to FIG. 8A, the grain dispenser 10 according to the embodiment of the present disclosure may provide a menu from which a name of each of the kinds of grain can be set. For example, in a case where the user selects a tap 800 for setting a miscellaneous grain name, as illustrated in FIG. 8A, a menu corresponding to each of the storage hoppers and a menu 810 for setting a miscellaneous grain name, from which a number of each of the storage hoppers and a name of a kind of grain that is stored in each of the storage hoppers are set.

The menu 810 for setting a miscellaneous grain name may include a selection menus 820 for automatically identifying a kind of grain that is stored in each of the store hoppers and a selection menu 830 for manually identifying a kind of grain that is stored in each of the store hoppers. In this case, in a case where the user selects the selection menu 820 for automatically identifying a kind of grain, the controller 100 may identify kinds of grain that are stored in the storage hoppers, respectively, on the basis of results of the identification by the grain identification sensor 131 provided on the storage unit 111, and may display results of the identification on the menu 810 for setting a miscellaneous grain name. In this case, instead of "not named," the results of the identification of the kinds of grain by the grain identification sensor 131 may be displayed on boxes marked "not named," respectively, on the menu 810 for setting a miscellaneous grain name.

In contrast, in a case where the user selects the selection menu 830 for manually identifying a kind of grain, the controller 100 may receive a name of a kind of grain that corresponds to each of the storage hoppers, as input, directly from the user. As an example, in a case where the user, as illustrated in FIG. 8A, selects a first storage hopper 811, the controller 100 may set a name of a kind of grain that is in consistent with the user input, as a name of a kind of grain that is stored in the first storage hopper 811. In this case, the user input may be an operation that, by touch or voice, inputs letters that correspond to a name of a specific kind of grain.

In a case where, in this manner, names of kinds of grain that are stored in the stored hoppers, respectively, are set, the controller 100 may display on the menus screen the names of the kinds of grain that are set. Therefore, in a case where the user selects the tap 730 for a "rice-miscellaneous-grain ratio," unlike in FIG. 7C, the names of the kinds of grain that are set, as illustrated in FIG. 8B, may be displayed on a rice-miscellaneous-grain ratio menu.

In addition, the grain dispenser 10 may receive a setting associated with alerting of the user to a residual amount, as input, from the user through the menu screen. For example, as illustrated in FIG. 8C, in a case where the user selects a tap 740 for "alerting to a residual amount, the controller 100 may display a menu for setting whether or not to alert the user to the residual amount of each of the kinds of grain that are stored in the storage hoppers, respectively. In this case, as illustrated in FIG. 8C, in a case where the user does not set residual amounts of kinds of grain other than "rice" to be alerted to the user, residual-amount checking may not perform on the kinds of grain other than "rice" may not be checked, and information associated with the alerting of the user to the insufficient residual amount resulting from the residual-amount checking may not be output. In this case, a purchase process necessary when the residual amount is insufficient may not be performed on the kinds of grain other than "rice."

As illustrated in FIG. 8C, the controller 100 may receive a minimum reserve amount, based on which the information associated with the alerting of the user to the insufficient residual amount is to be output, directly from the user. In a case where, in this manner, the minimum reserve amount is directly received from the user, the directly received minimum amount of stockpiled grain may take precedence over the minimum reserve amount that is automatically computed as illustrated in FIG. 6. Therefore, the controller 100 may output the information associated with the alerting of the user to the insufficient residual amount on the basis of the directly received minimum reserve amount. Moreover, according to the user selection, the purchase process may be performed on only a kind of grain that is a target to which the information associated with the alerting of the user to the insufficient residual amount is output.

Figure 9:
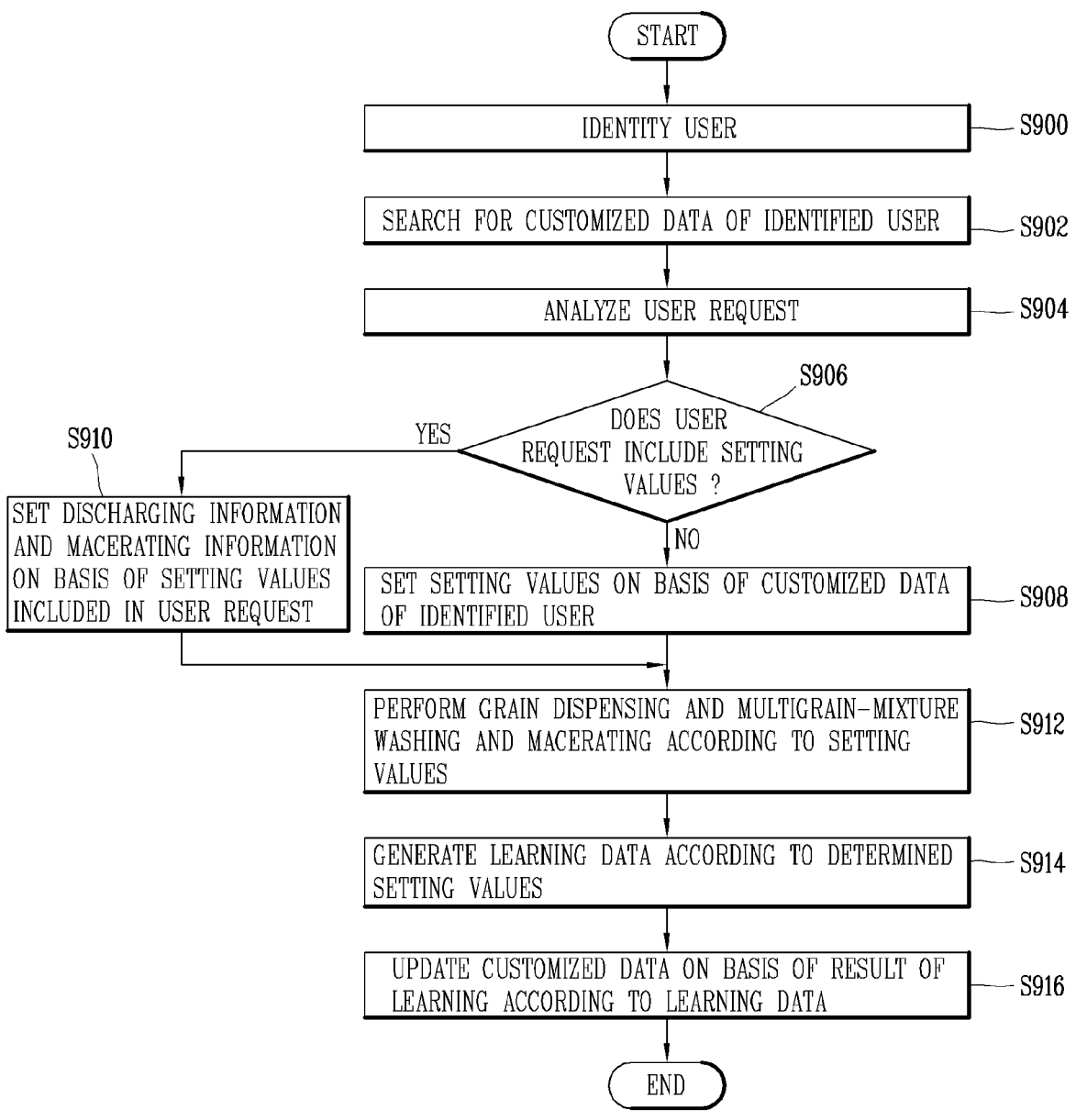
FIG. 9 is a flowchart illustrating a process in which the grain dispenser according to the present disclosure operates to perform grain dispensing on the basis of the customized data of the user.

FIG. 9 is a flowchart illustrating a process in which the grain dispenser 10 according to the present disclosure operates to perform grain dispensing on the basis of the customized data of the user.

With reference to FIG. 9, when receiving a user request for grain dispensing for meal cooking, the controller 100 of the grain dispenser 10 according to the present disclosure may identify the user from the user request (S900). As an example, the controller 100 may identify the user who makes the request for grain dispensing, which is received, on the basis of the voice of the user who utters the voice command that corresponds to the user request, or the image of the user who utters the voice command that corresponds to the user request.

Then, the controller 100 may search for the customized data corresponding to the identified use (S902). The controller 100 may analyze the user request (S904) and thus may determine whether or not setting values for grain dispensing are included in the user request (S906). The setting values here for grain dispensing is setting values necessary to dispense kinds of grain and may be information on which kinds of grain to dispense (kinds of grain to be dispensed), how much to dispense kinds of grain (the total amount of grain to be dispensed), and how to dispense kinds of grain (the multigrain mixture ratio).

In this case, in a case where the user request includes a name of a specific kind of grain other than the designated rice, the controller 100 may determine that the user makes a request to dispense the specific kind of grain. However, in a case where the user request does not include the name of the specific kind of grain, the control 100 may detect whether or not the user request includes a specific point in time at which the kind of grain is dispensed. In a case where the user request includes the specific point in time at which the kind of grain is dispensed, the controller 100 may determine a specific kind of grain other than rice that is to be mixed with the rice, from a grain dispense record at the specific point in time.

Likewise, the amount of grain to be dispensed and the multigrain mixture ratio may also be determined. For example, in a case where the user request includes information on the amount of the meal (for example, for two persons) or the multigrain mixture ratio, the controller 100 may determine the amount of grain to be dispensed or the multigrain mixture ratio according to the designated amount of the meal or the designated multigrain mixture ratio. In addition, in a case where the user request includes information on the specific point in time at which the kind of grain is dispensed, the controller 100 may determine the amount of grain to be dispensed or the multigrain mixture ratio, from the grain dispense record at the specific point in time (S910).

However, in a case where the result of the determination in Step S906 is that the received user request does not include the setting value (a predetermined value or a specific point in time) for grain dispensing, the controller 100 may determine the setting values for grain dispensing, on the basis of the customized data of the user that is found as a result of the search in Step S902. That is, in a case where the user request does not include the setting value, the controller 100 may determine the setting values for grain dispensing, based on a result of the artificial intelligence unit 180 learning a kind of grain, an amount of grain to be dispensed, and a multigrain mixture ratio that are preferred by the user, on the basis of a previous record showing information associated with the kind of grain that is dispensed according to the user request (S908).

When the setting values (the kind of grain to be dispensed, the amount of grain to be dispensed, and the multigrain mixture ratio) for grain dispensing are determined on the basis of the result of performing Step S908 or S910, the controller 100 may control the dispensing main body 112 in such a manner that the grain dispensing is performed according to the determined setting values. The controller 100 may perform a process of washing the kinds of grain that are dispensed and a process of macerating the kinds of grain that are washed, according to a predetermined amount of water for meal cooking (S914).

Then, the controller 100 may generate the learning data that vary with the determined setting values (S914). In Step S914, the setting values determined in Step S908 or S910 may be generated as the learning data in a predetermined format. When the learning data are generated as the result of performing Step S914, the controller 100 may input the generated learning data into the artificial intelligence unit 180 in such a manner that the artificial intelligence unit 180 may perform learning according to the setting values determined in Step S908 or S910. When the controller 100 inputs the generated learning data, the artificial intelligence unit 180 may perform the learning on the basis of the setting values determined in Step S908 or S910 and may update the customized data of the identified user according to a result of performing the learning (S916).

Figure 10:
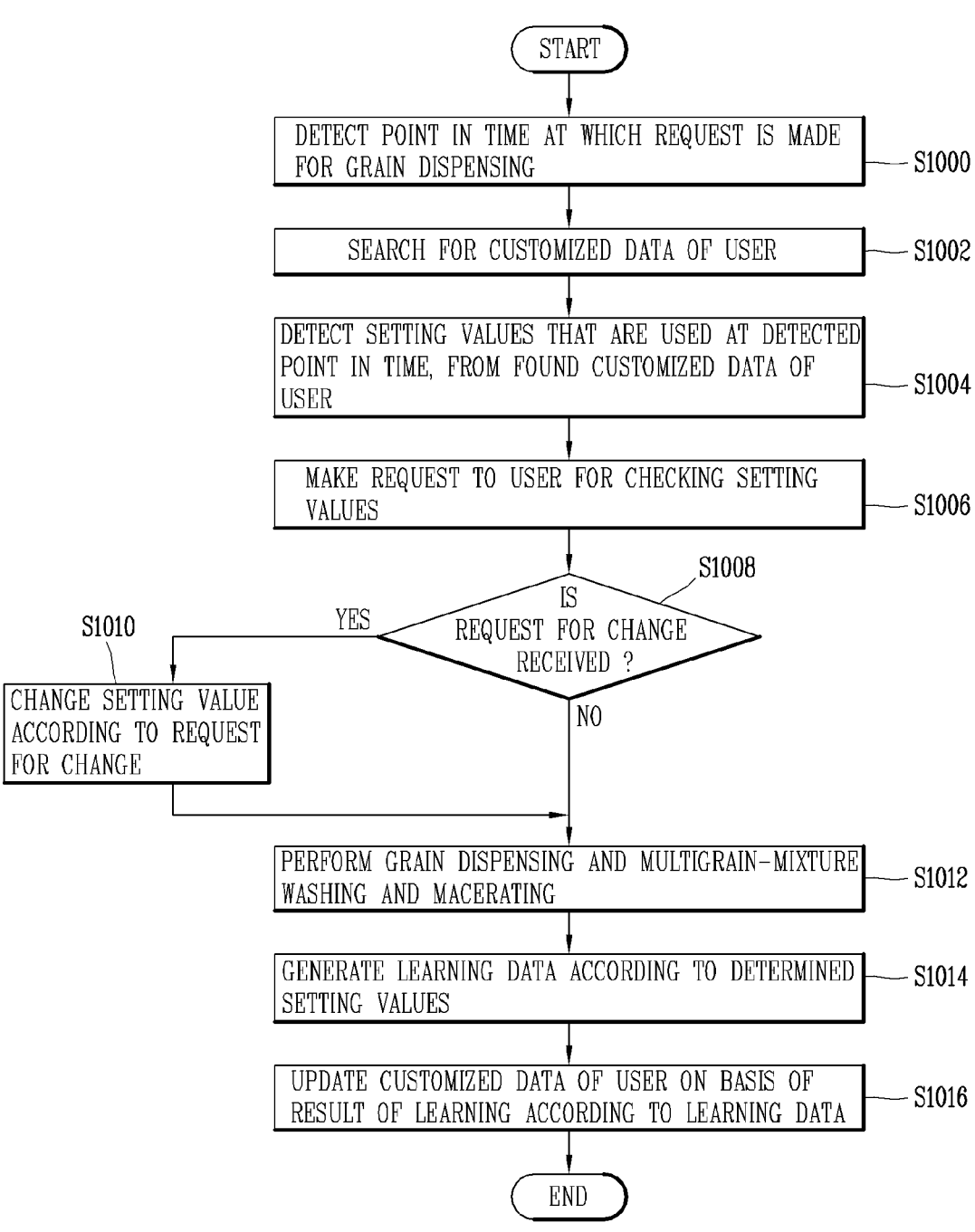
FIG. 10 is a flowchart illustrating a process in which the grain dispenser according to the embodiment of the present disclosure operates to perform the grain dispensing according to the customized data of the user that result from learning on the basis of the time at which a user makes a request for grain dispensing.

As described above, the grain dispenser 10 according to the embodiment of the present disclosure may learn the setting values for grain dispensing that are preferred by the user, on the basis of the time at which the user makes the request for grain dispensing. FIG. 10 is a flowchart illustrating a process in which the grain dispenser 10 according to the embodiment of the present disclosure, as described above, operates to perform the grain dispensing according to the customized data of the user that result from the learning on the basis of the time at which the user makes the request for grain dispensing.

With reference to FIG. 10, when receiving the user request for grain dispensing for meal cooking, the controller 100 of the grain dispenser 10 according to the embodiment of the present disclosure may detect a point in time at which the user request is received (S1000). The controller 100 of the grain dispenser 10 according to the embodiment of the present disclosure may identify the user from the received user request for meal cooking and may search for the customized data of the user that result from the learning (S1002).

In a case where the received user request does not include at least one of the setting values for grain dispensing, the controller 100 may determine the setting value that is not included in the user request, from the customized data of the user that are found as a result of the search for in Step S1002 (S1004). The customized data here may be data that result from learning at least one of the kind of grain to be dispensed, the amount of grain to be dispensed, and the multigrain mixture ratio that are preferred by the user on a per-time basis. Therefore, in Step S1004, the controller 100 may detect at least one of the kind of grain to be dispensed, the amount of grain to be dispensed, and the multigrain mixture ratio that are learned at the point in time at which the user request is received, from the customized data of the user. Therefore, at least one of the kind of grain to be dispensed, the amount of grain to be dispensed, and the multigrain mixture ratio that are detected may vary in a case where the user makes the request for grain dispensing at different points in time, When at least one of the amount of grain to be dispensed, the amount of grain to be dispensed, and the multigrain mixture ratio that are learned at the point in time at which the user request is received is detected in Step S1004, the controller 100 may make a request to the user for checking at least one of the kind of grain to be dispensed, the amount of grain to be dispensed, and the multigrain mixture ratio that are detected (S1006). Using a response to the request for checking, it may be determined whether or not the user makes a request for a change (S1008). In a case where the user makes the request for the change, at least one of the setting values (the kind of grain to be dispensed, the amount of grain to be dispensed, and the multigrain mixture ratio) that are detected in Step S1004 may be changed on the basis of the received request for the change (S1010).

In a case where the result of the determination in Step S1008 is that the user does not make the request for the change request or where the setting values for grain dispensing are completely set through the change in Step S1010, the controller 100 may dispense, stir, and wash the multigrain mixture according to the setting values that are completely set, and may perform a process of macerating the washed multigrain mixture according to the predetermined amount of water for meal cooking (S1012).

Then, the controller 100 may generate the learning data that vary with the setting value extracted from the customized data that result from the learning according to the point in time at which the user makes the request for grain dispensing, or with the setting value that is changed according to the request by the user for the change (S1014). When the learning data are generated in compliance with a format predetermined in Step S1014, the controller 100 may input the generated learning data into the artificial intelligence unit 180 in such a manner that the artificial intelligence unit 180 performs the learning according to the setting values extracted from the customized data that result from the learning, or the setting value that is changed according to the request by the user for the change. When the controller 100 inputs the generated learning data, the artificial intelligence unit 180 may perform the learning and may update the customized data of the identified user according to a result of performing the learning (S1016).

Through the communication unit 140, the grain dispenser 10 according to the embodiment of the present disclosure may perform wireless communication with at least one external apparatus or a preset external server. Information associated with health of the user may be collected through the external apparatus or server that is connected through the wireless communication, and at least one food recipe may be recommended on the basis of the collected information.

Figure 11:
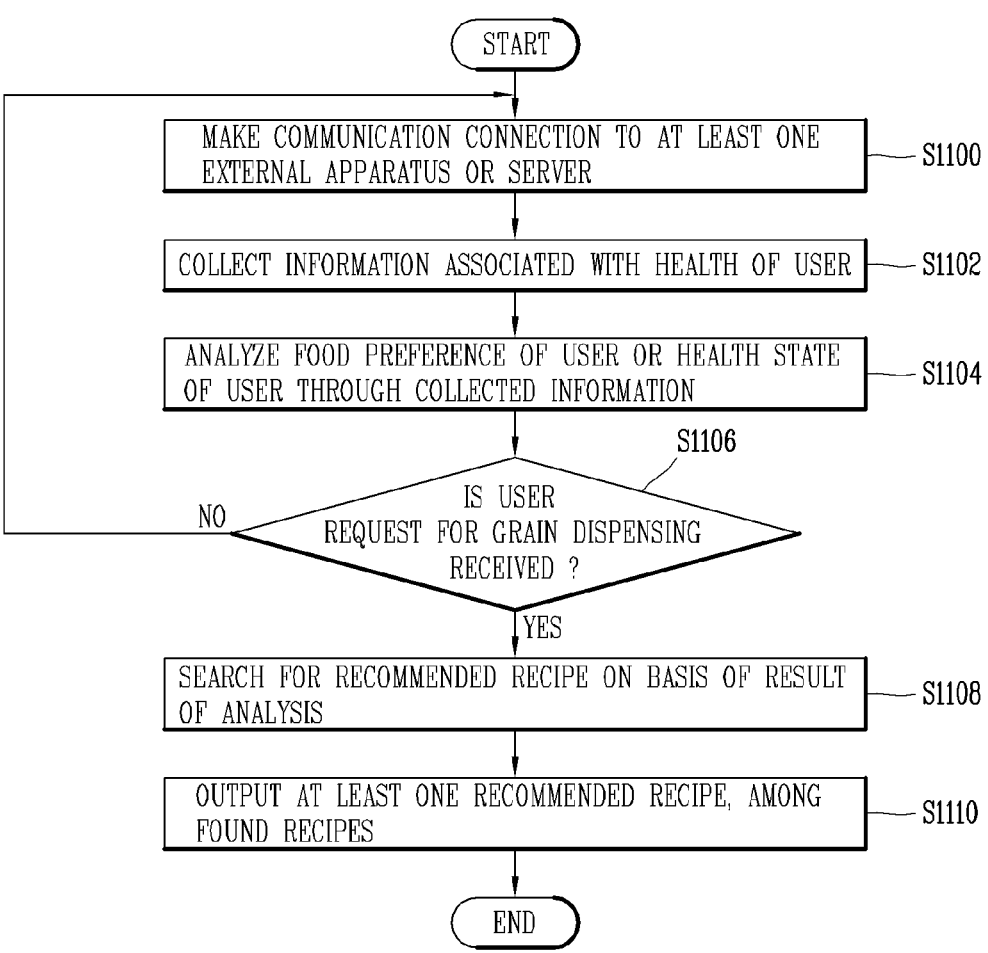
FIG. 11 is a flowchart illustrating a process in which the grain dispenser according to the embodiment of the present disclosure operates to recommend at least one food recipe according to a result of analyzing a health state of the user.

FIG. 11 is a flowchart illustrating a process in which the grain dispenser 10 according to the embodiment of the present disclosure operates to recommend at least one food recipe according to a result of analyzing a health state of the user.

With reference to FIG. 11, the controller 100 of the grain dispenser 10 may make a connection to at least one external apparatus or a preset external server in the vicinity of the user through the communication unit 140 (S1100). At least one external apparatus here in the vicinity of the user may be a wearable apparatus, such as a smartwatch or smartglasses, that is worn by the user, or a mobile terminal, such as a smartphone, that is carried by the user. In addition, the preset external server may be a server that provides information associated with movement of the user or information associated with a food ingested by the user. As an example, the external serve may be a server of a restaurant that is frequently visited by the user.

When a communication connection is made to at least one external apparatus and or server in Step S1100, the controller 100 may collect the information associated with the health of the user from at least one external apparatus or server that is connected. The information here associated with the health of the user may be information on the food ingested by the user.

As an example, when the user visits a restaurant, a server of the restaurant, that is, the external server, may make a connection to a mobile terminal of the user and may transmit log information that is generated in association with the user's visit to the restaurant, to the mobile terminal of the user. Through the log information stored in the mobile terminal of the user, the grain dispenser 10 may make a connection to the server (the external server) of the restaurant (S1100) and may collect information on the food purchased by the user (for example, a record of payments by the user's credit card) (Step S1102).

In addition, the information associated with the health of the user that is collected in Step S1102 may be bio-information, such as a blood pressure, a pulse rate, and an electrocardiogram of the user, that is collected in the wearable device worn by the user, the mobile terminal carried by the user, or the like. In addition, the information associated with the health of the user that is collected in Step S1102 is information associated with eating habits of the user, and may include customized data that result from learning the kind of food, the multigrain mixture ratio, and the amount of grain to be dispensed, and the like that are preferred by the user, according to the previous grain dispense record of the user that results from the learning.

When the information associated with the health of the user is collected in Step S1102, the controller 100 may analyze at least one of the food preference of the user and the health state of the user through the collected information (S1104). For example, the controller 100 may analyze characteristics of the food and the meal that are preferred by the user, on the basis of the food preferably ingested by the user and the kinds of grain that are dispensed at the request of the user.

Alternatively, the controller 100 may analyze the health state of the user on the basis of the collected bio-information of the user. In this case, the controller 100 may make a further request to the user for body state information of the user, such as a height or a weight, in order to analyze the health state of the user in more detail. In a case where the user inputs the body state information, the controller 100 may analyze the heath state of the user in more detail on the basis of the body state information of the user that is input.

When at least one of the food preference of the user and the health state of the user is completely analyzed in Step S1104, the controller 100 may detect whether or not the user makes the request for grain dispensing (S1106). When the result of the detection is that the user does not make the request for grain dispensing, the controller 100 may re-perform Steps S1100 to S1104 and may update at least one of the food preference of the user and the health state of the user that have been analyzed up to now.

Conversely, when the result of the detection in Step S1106 is that the user makes the request for grain dispensing, the controller 100 may search for at least one food recipe suitable for the food preference of the user or the health state of the user on the basis of a result of the analysis in S1104 (S1108).

As an example, the controller 100 may search for a recipe for a specific kind of food corresponding to the food preference of the user. In addition, the controller 100 may search for a food recipe beneficial to the health of the user on the basis of the analyzed health state of the user. For example, in a case where the user is overweight, the controller 100 may search for a food recipe beneficial to a diet. In a case where, as a result of analyzing the health state of the user, it is determined that the user gets nervous or under stress, the controller 100 may search for a food recipe necessary for preparing a menu beneficial to relieve the nervous or stressed state. To this end, a recipe database (not illustrated) including a plurality of food recipes that are categorized under different food preferences, different health states, or the like is stored in the memory 170 of the grain dispenser 10 according to the embodiment of the present disclosure. Alternatively, the grain dispenser 10 may make a communication connection to a preset external server that provides a plurality of food recipes.

Step S1108 of searching for the food recipe may include a step of searching for the food recipe on the basis of a currently stored food material through a communication connection to a preset external apparatus (for example, a refrigerator) in which food materials are stored. That is, through the communication connection to the refrigerator, the controller 100 may detect food materials currently stored in the refrigerator and may search for recipes for foods that can be cooked using the detected food materials.

When the search for the food recipes is finished in Step S1108, in response to the user request received in Step S1106, the controller 100 may output at least one of the found food recipes, as a recommended food recipe, to the user (S1110). In this case, when the user does not select any one of the recommended food recipes, the controller 100 may dispense a kind of grain according to the user request for grain dispensing or the customized data of the user and may perform processes of washing and macerating the multigrain mixture according to the amount of water for food cooking and the macerating time that are consisted with the received request from the user. However, in a case where the user selects any one of the recommended food recipes, the controller 100 may additionally provide the user with information on the selected food recipe or may perform a process of dispensing a kind of grain necessary for meal cooking according to the selected food recipe.

Figure 12:
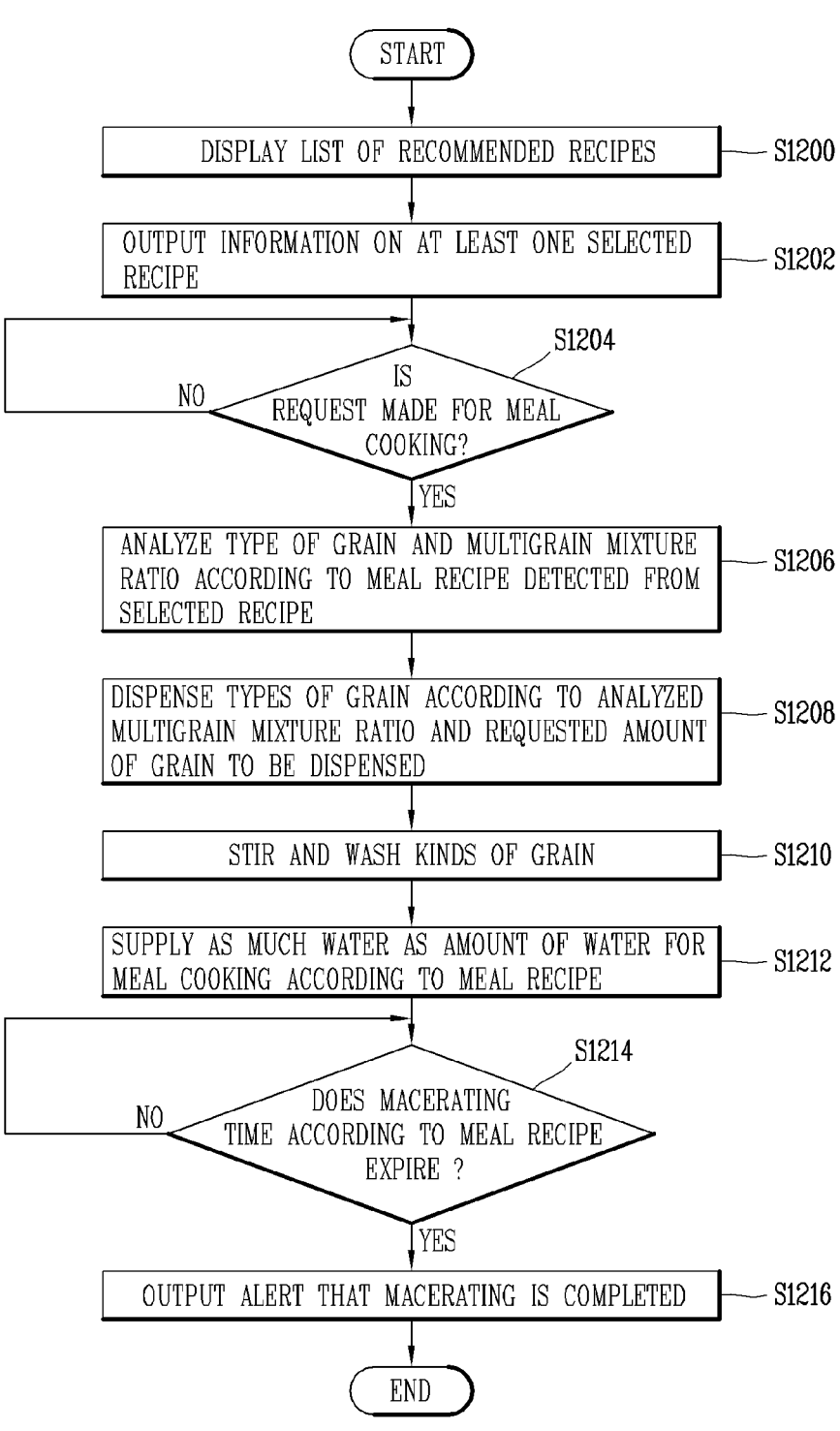
FIG. 12 is a flowchart illustrating a process in which the grain dispenser according to the embodiment of the present disclosure operates to prepare a kind of grain necessary for meal cooking according to the food recipe selected by the user.

FIG. 12 is a flowchart illustrating a process in which the grain dispenser 10 according to the embodiment of the present disclosure operates to prepare a kind of grain necessary for meal cooking according to the food recipe selected by the user.

With reference to FIG. 12, the controller 100 of the grain dispenser 10 according to the embodiment of the present disclosure may output a list of currently recommended food recipes (S1200). For example, the grain dispenser 10 may output the list of the currently recommended food recipes on the display unit 161 of the output unit 160 or may output the list of the currently recommended food recipes to a display unit of the preset external apparatus for being displayed thereon.

When any one of the food recipes being output is selected, the controller 100 may output more detailed information on the selected recipe to the display unit for being displayed thereon (S1202). For example, the controller 100 may output the information on the selected recipe in a video format on the basis of each of the cooking processes that are stated in the selected recipe. In this case, the controller 100 may control output of the information on the recipe that is provided in the video format, through the voice command from the user. That is, the user may input voice commands, such as "Stop," "Reproduce," "Fast," and "Backward." With these voice commands from the user, a video image of the information on the recipe may be reproduced, fast-wounded, or wound, or reproducing of the video image may be stopped.

In a state where the information on the recipe is output, the controller 100 may receive the user request for meal cooking (S1204). In a case where the user request for meal cooking is received, the controller 100 may detect a meal recipe associated with the meal, from the recipe for the selected food. Kinds of grain and a multigrain mixture ratio that correspond to the detected meal recipe may be analyzed (S1206). The dispensing main body 112 may be controlled in such a manner that the kinds of grain that are analyzed are dispensed according to the amount of the meal (for example, three persons) that is consistent with the user request and to the analyzed multigrain mixture ratio (S1208).

When the kinds of grain are dispensed, the kinds of grain that are dispensed may be stirred in such a manner as to be uniformly mixed with each other, and the stirring and washing unit 120 may be controlled in such a manner that the multigrain mixture resulting from the stirring is washed (S1210). When the stirring and the washing are completed, the water supply unit 121 may be controlled in such a manner that the amount of water for meal cooking according to the detected meal recipe is supplied to the stirring and washing container 125 (S1212). When the supplying of the water for meal cooking is completed, the controller 100 may initialize a timer and may check whether or not the macerating time according to the detected meal recipe expires (S1214). In a case where the macerating time according to the detected meal recipe expires, an alerting signal that alerts the user that the macerating of the multigrain mixture is completed may be output (S1216).

The user may put into the container the completely macerated multigrain mixture and the water for meal cooking and may cook the meal using a separate cooker for cooking the meal. Or, in a case where the grain dispenser 10 has the cooking function, the grain dispenser 10 may be enabled to perform the cooking function. Therefore, the control unit 100 may apply heat or pressure to the container containing the multigrain mixture that is completely macerated in Step S1216 and the water for meal cooking and may cook the meal as stated in the currently selected recipe.

A grain dispenser according to another embodiment of the present disclosure may operate in conjunction with a different artificial intelligence device. In this case, the artificial intelligence device may function as the artificial intelligence platform or the artificial intelligence unit 180 of the grain dispenser 10, which is described above, according to the embodiment of the present disclosure.

Figure 13:
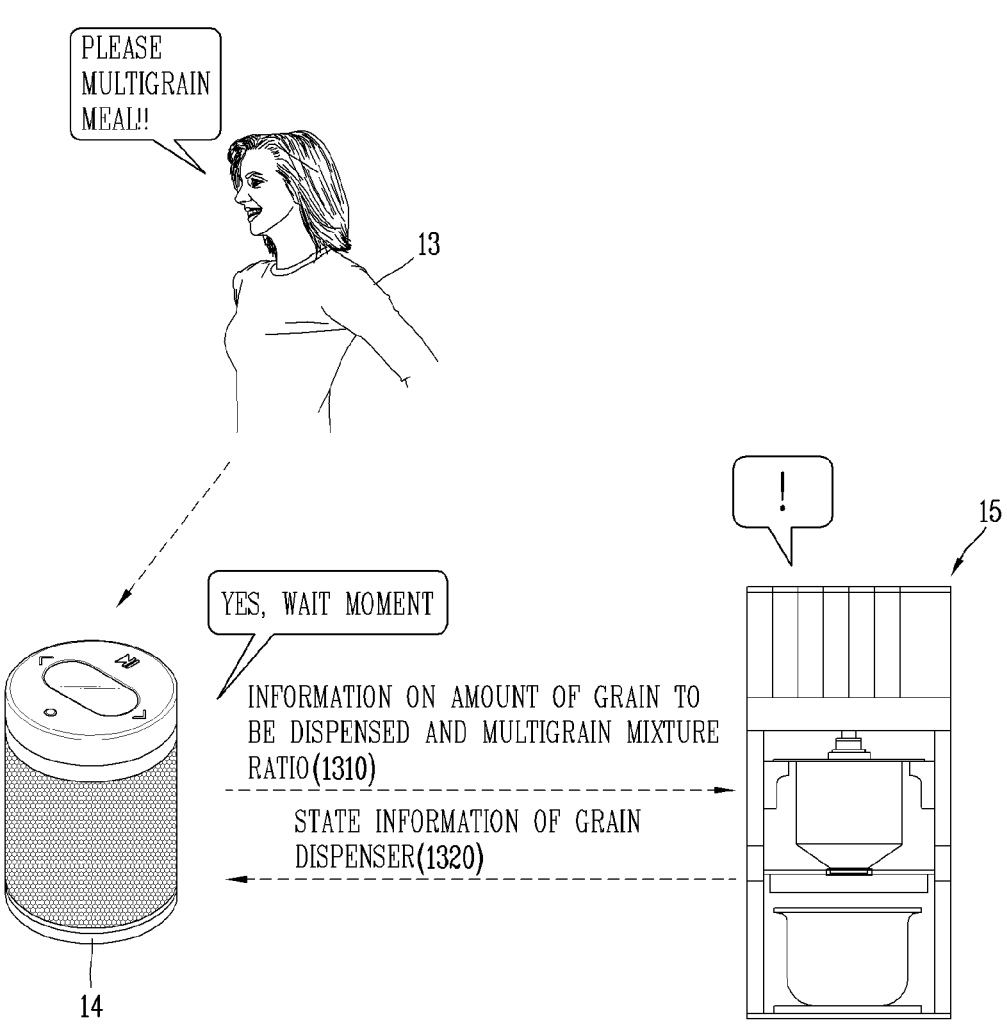
FIG. 13 is a view illustrating an example in which a grain dispenser according to another embodiment of the present disclosure operates in conjunction with a different artificial intelligence device.
Figure 14:
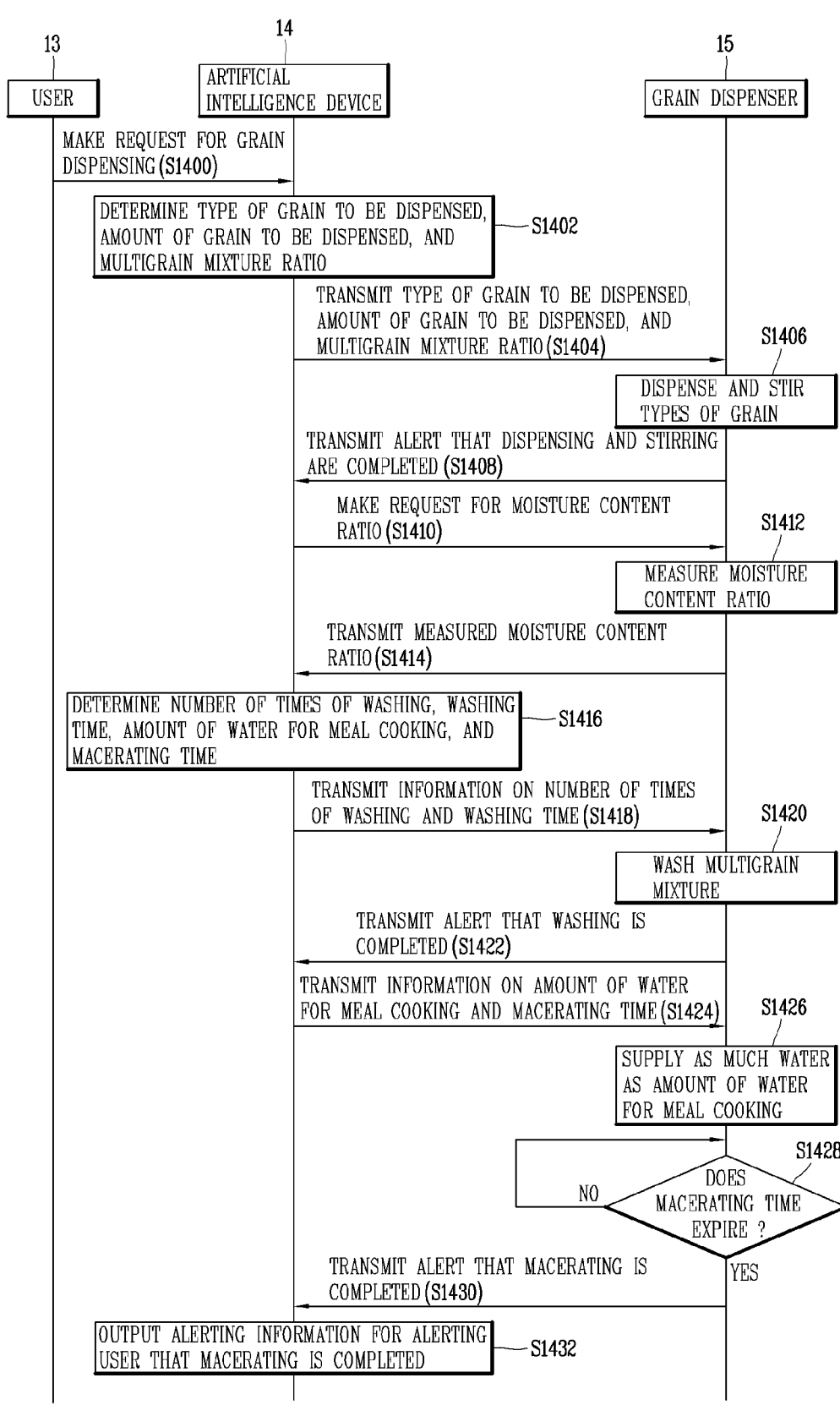
FIG. 14 is a flow chart illustrating a process in which the grain dispenser, illustrated in FIG. 13, operates to prepare a kind of grain, necessary for meal cooking, in conjunction with the artificial intelligence device.

FIG. 13 is a view illustrating an example in which, in this case, a grain dispenser 15 according to another embodiment of the present disclosure operates in conjunction with an artificial intelligence device 14. FIG. 14 is a flow chart illustrating a process in which the grain dispenser 15, illustrated in FIG. 13, operates to prepare a kind of grain, necessary for meal cooking, in conjunction with the artificial intelligence device 14.

First, with reference to FIG. 13, the artificial intelligence device 14 and the grain dispenser 15 may be connected to each other for communication through various short-range communication network technologies, such as Bluetooth Low Energy (BLE). When the user makes a request for grain discharging using a function of conducting a dialogue with a user (S1400), the artificial intelligence device 14 may determine a total amount of grain to be dispensed, a kind of miscellaneous grain to be mixed with rice, a rice-miscellaneous-grain mixture ratio, and the like, which are consistent with the amount of the meal that is requested by the user (S1402).

Then, the artificial intelligence device 14 may transmit information 1310 on the total amount of grain to be dispensed, the kind of miscellaneous grain to be mixed with rice, and the rice-miscellaneous-grain mixture ratio that are determined, to the grain dispenser 15 (S1404).

The artificial intelligence device 14 here may identify the user from the received voice information of the user. The personalized data of the identified user, that is, the customized data, may be provided to the grain dispenser 15. In this case, the customized data may include information (information on the amount of the meal) on the amount of grain to be dispensed for one person and information (information on the food texture of the meal) on the amount of water for meal cooking, the macerating time, and the like that are preferred by the identified user. To this end, the artificial intelligence device 14 may provide information for dispensing a kind of grain according to the user request, may learn the information on the amount of the meal and the food texture of the meal that are preferred by the identified user, and may reflect results of the learning in the customized data.

Then, the grain dispenser 15 may control the dispensing main body 112 in such a manner that rice and at least one kind of grain other than the rice are dispensed, on the information received from the artificial intelligence device 14. Then, in response to the information received from the artificial intelligence device 14, information 1320 associated with a state of the grain dispenser 15 may be transmitted to the artificial intelligence device 14.

The state information here may include information associated with the residual amounts of the kinds of grain that are stored. As an example, in a case where the residual amounts of rice and at least one kind of grain other than rice that are stored in the storage unit 111 are the same as or smaller than preset minimum reserve amounts, respectively, the grain dispenser 15 may transmit information for alerting the user that the amounts of the above two kinds of grain are insufficient, to the artificial intelligence device 14. Then, the artificial intelligence device 14 may alert the user to a kind of grain of which a residual amount is insufficient, through the voice information and, at the same time, may perform a process of purchasing such a kind of grain according to the user selection.

The grain dispenser 15 may stir the kinds of grain that are discharged. The artificial intelligence device 14 may be alerted to the completion of the grain dispensing and stirring (for example, transmission of the alerting information) of the kinds of grain. Then, the artificial intelligence device 14 may make a request to the grain dispenser 15 for information on the moisture content ratio of the grain (S1410). Then, the grain dispenser 15 may measure at least one kind of grain, among kinds of grain that are stored in the storage unit 111, through at least one moisture content ratio sensor (S1412). In response to the request for information on the moisture content ratio, the measured moisture content ratio of the grain may be transmitted to the artificial intelligence device 14.

Then, the artificial intelligence device 14 may determine the washing time, the number of times of washing, the amount of water for meal cooking, and the macerating time, which are necessary for the kinds of grain that are mixed by the stirring, that is, for the multigrain mixture, on the basis of the received moisture content ratio of the grain (S1416).

The artificial intelligence device 14 may transmit information on the washing time and the number of times of washing that are determined, to the grain dispenser 15 (S1418). The grain dispenser 15 may wash the multigrain mixture on the basis of the received information on the washing time and the number of times of washing (S1420). In a case where the washing is completed, the alerting information for alerting the user that the washing is completed may be transmitted to the artificial intelligence device 14 (S1422).

In response to the alerting information for alerting the user that the washing is completed, the artificial intelligence device 14 may transmit information on the amount of water for meal cooking and the macerating time that are determined, to the grain dispenser 15 (S1424). The grain dispenser 15 may supply water to the stirring and washing container 125 according to the received amount of water for meal cooking (S1426).

In a case where as much water as the amount of water for meal cooking is supplied, the grain dispenser 15 may stop supplying the water and may initialize the timer. The timer may serve to measure the time for which the multigrain mixture is soaked in the water for meal cooking, in such a manner that the multigrain mixture is macerated, for the macerating time, in the amount of water for meal cooking that is determined. When the result of measuring the elapsed time through the timer is that the macerating time expires (S1428), the grain dispenser 15 may transmit the alerting information for alerting the user that the macerating time expires, to the artificial intelligence device 14 (S1430). The artificial intelligence device 14 may output the alerting information for alerting the user that the macerating of the multigrain mixture is completed, in such a manner that the user can recognize that the macerating of the multigrain mixture is completed (S1432).

The user may put into the container the completely macerated multigrain mixture and the water for meal cooking and may cook the meal using a separate cooker for cooking the meal. In addition, in the case where the grain dispenser 15 has the cooking function, the request to perform the cooking function of the grain dispenser 15 may be made to the artificial intelligence device 14. Then, the artificial intelligence device 14 may transmit a request to the grain dispenser 15 to start to perform the cooking function, to the grain dispenser 15. In response to this request, the artificial intelligence device 14 may apply heat or pressure to the container containing the kinds of grain that are completely macerated and the water for meal cooking.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

What is claimed is:

1. A grain dispenser comprising:

a storage comprising a plurality of storage hoppers for respectively storing different kinds of grain;

a container configured to accommodate the kinds of grain to be dispensed from the storage;

a water supply configured to supply water to the container;

a water drainer configured to drain the supplied water from the container;

a container actuator configured to rotate the container by a predetermined angle in order to mix and wash the kinds of grain that are accommodated by the container;

an artificial intelligence device configured to identify a user who makes a request for meal cooking, based on receiving the request for meal cooking from the user, and to learn a kind of grain to be dispensed, an amount of grain to be dispensed, and a multigrain mixture ratio that are preferred by the user, according to a grain dispense record of the identified user;

a memory device configured to store customized data of the user including at least one of the kind of grain to be dispensed, the amount of grain to be dispensed, or the multigrain mixture ratio that are preferred by the identified user according to a result of the learning by the artificial intelligence device; and a controller device configured to:

control the storage such that the kinds of grain that are stored in the storage are dispensed, control the container actuator to stir the kinds of grain that are accommodated in the container and to wash a multigrain mixture resulting from the stirring, and control the water supply and the water drainer such that the multigrain mixture is macerated in a certain amount of water for meal cooking for a certain maceration time, based on the customized data of the user corresponding to the received request.

2. The grain dispenser of claim 1, wherein the artificial intelligence device is further configured to, based on an analysis of the received request resulting in a determination that the received request does not include at least one of a kind of grain to be dispensed, an amount of grain to be dispensed, or a multigrain mixture ratio, determine the at least one of the kind of grain to be dispensed, the amount of grain to be dispensed, or the multigrain mixture ratio not included in the received request, based on the customized data of the user.

3. The grain dispenser of claim 1, wherein the artificial intelligence device is further configured to, based on receiving the request from the user, detect a point in time at which the request is received and learn at least one of a kind of grain that is dispensed according to the received request, an amount of grain that is dispensed according to the received request, or a multigrain mixture ratio that is determined according to the received request as at least one of the kind of grain to be dispensed, the amount of grain to be dispensed, and the multigrain mixture ratio that are preferred by the user at the detected point in time.

4. The grain dispenser of claim 1, wherein the storage further comprises:

at least one moisture content ratio sensor for measuring moisture content ratios of the kinds of grain that are respectively stored in the plurality of storage hoppers, and wherein the controller device is further configured to determine the certain amount of water for meal cooking and the certain maceration time based on the measured moisture content ratios and the multigrain mixture ratio for the multigrain mixture.

5. The grain dispenser of claim 4, wherein the at least one moisture content ratio sensor comprises a camera-type sensor configured to measure infrared ray absorption ratios of the kinds of grain that are respectively stored in the plurality of storage hoppers, or an electrode-type sensor configured to measure impedance characteristics of the kinds of grain that are respectively stored in the plurality of storage hoppers.

6. The grain dispenser of claim 4, wherein the controller is further configured to detect a kind of grain of which an amount is equal to or higher than a preset amount, among mixed kinds of grain in the multigrain mixture, and determine a moisture content ratio of the entire multigrain mixture based on the measured moisture content ratios.

7. The grain dispenser of claim 4, wherein the controller device is further configured to, based on the user making a request for a change of the determined amount of water for meal cooking or the determined maceration time, change the determined amount of water for meal cooking or the determined maceration time according to the request by the user for the change, and wherein the artificial intelligence device is further configured to learn the customized data further including information on the amount of water for meal cooking or the maceration time that is preferred by the user, based on the amount of water for meal cooking or the maceration time that is changed according to the request by the user for the change, and, in response to a request by the controller device, provide, to the controller device, the customized data further including the information on the amount of water for meal cooking or the maceration time.

8. The grain dispenser of claim 1, further comprising:

a communication device configured to wirelessly communicate with a preset external apparatus or a preset server, wherein the artificial intelligence device is further configured to analyze a food preference of the user and a health state of the user based on the customized data of the user and information associated with a health of the user, that is collected from the preset external apparatus or the preset server for a preset period of time, search for at least one food recipe based on the analyzed food preference and health state of the user, and provide the at least one food recipe to the controller device.

9. The grain dispenser of claim 8, further comprising:

an output device configured to output at least one of an audio signal or a video signal, wherein the controller device is further configured to:

control the output device to output at least one food recipe that is provided from the artificial intelligence device, extract a meal recipe associated with a meal, from a selected food recipe, in response to selection of the food recipe by the user, and control the storage to discharge the kinds of grain according to at least one of a kind of grain to be dispensed, an amount of grain to be dispensed, and a multigrain mixture ratio that are specified in the extracted meal recipe.

10. The grain dispenser of claim 9, wherein the controller device is further configured to determine at least one of an amount of water for meal cooking or a macerating time for the kinds of grain that are discharged, based on the extracted meal recipe, and control the water supply and the water drainer such that a multigrain mixture of the discharged kinds of grain is macerated according to the determined at least one of the amount of water for meal cooking or the macerating time.

11. The grain dispenser of claim 8, wherein the controller device is further configured to collect information on a food material that is stored in the preset external apparatus, via communication to the preset external apparatus, and search for at least one food recipe based on the collected information on the food material.

12. The grain dispenser of claim 1, wherein the artificial intelligence device is separate from the grain dispenser to communicate with the grain dispenser.

13. The grain dispenser of claim 1, wherein the container comprises:

a water inlet connected to the water supply such that the water is supplied to the container from the water supply through the water inlet;

a water outlet connected to the water drainer such that the supplied water is drainable through the water outlet;

a container cover configured to rotate the container based on a shaft, located at a center of the container cover and connected to the container actuator, being rotated by the container actuator; and a discharging outlet port located at a lower end portion of the container to be opened and closed under control by the controller device, so that the amount of water for meal cooking and the multigrain mixture that is accommodated in the container are discharged when the discharging outlet port is opened.

14. The grain dispenser of claim 1, wherein the storage further comprises:

at least one camera for acquiring images of the kinds of grain that are respectively stored in the plurality of storage hoppers, and wherein the controller device is further configured to identify the kinds of grain that are respectively stored in the plurality of storage hoppers, based on the images acquired by the at least one camera.

15. The grain dispenser of claim 1, wherein the storage further comprises at least one residual-amount sensor for measuring residual amounts of the kinds of grain that are respectively stored in the plurality of storage hoppers, and wherein the controller device is further configured to detect a kind of grain whose measured residual amount is smaller than a preset minimum reserve amount, among the kinds of grain that are respectively stored in the plurality of storage hoppers, and provide alert information for alerting the user that the measured residual amount of the detected kind of grain is insufficient.

16. The grain dispenser of claim 15, wherein the controller device is further configured to perform a process of purchasing the detected kind of grain, based on a response by the user to the provided alert information.

\* \* \* \* \*